(12) United States Patent
Savargaonkar et al.

(10) Patent No.: US 10,800,148 B2
(45) Date of Patent: Oct. 13, 2020

(54) MULTI-PLY STRUCTURES, PACKAGES, AND METHODS OF STERILIZATION

(71) Applicant: Printpack Illinois, Inc., Elgin, IL (US)

(72) Inventors: Nilesh Savargaonkar, Marietta, GA (US); James Ray, Marietta, GA (US); Justin Houck, Marietta, GA (US)

(73) Assignee: Printpack Illinois, Inc., Elgin, IL (US)

( * ) Notice: Subject to any disclaimer, the term of this patent is extended or adjusted under 35 U.S.C. 154(b) by 25 days.

(21) Appl. No.: 16/337,259

(22) PCT Filed: Jun. 30, 2017

(86) PCT No.: PCT/US2017/040248
§ 371 (c)(1),
(2) Date: Mar. 27, 2019

(87) PCT Pub. No.: WO2018/063469
PCT Pub. Date: Apr. 5, 2018

(65) Prior Publication Data
US 2019/0240959 A1    Aug. 8, 2019

Related U.S. Application Data

(60) Provisional application No. 62/400,792, filed on Sep. 28, 2016.

(51) Int. Cl.
*B32B 27/08*    (2006.01)
*B32B 7/06*    (2019.01)
(Continued)

(52) U.S. Cl.
CPC ............... *B32B 27/08* (2013.01); *B32B 7/02* (2013.01); *B32B 7/06* (2013.01); *B32B 7/12* (2013.01);
(Continued)

(58) Field of Classification Search
CPC .. B32B 27/08; B32B 7/02; B32B 7/06; B32B 7/12; B32B 27/16; B32B 27/18;
(Continued)

(56) References Cited

U.S. PATENT DOCUMENTS 5,770,301 A    6/1998  Murai et al.
6,110,548 A *  8/2000  Kinsey .................... B32B 27/10
                                                  428/34.2
(Continued)

FOREIGN PATENT DOCUMENTS

CN    104476870 A    4/2015
JP    2009217178 A   9/2009
(Continued)

OTHER PUBLICATIONS

International Search Report and Written Opinion, PCT/US2016/025642, 12 pages, dated Jul. 8, 2016.
(Continued)

*Primary Examiner* — Jes F Pascua
(74) *Attorney, Agent, or Firm* — Eversheds Sutherland (US) LLP

(57) ABSTRACT

Multi-ply structures are provided that include a barrier film, which has a first polyester layer and a barrier coating layer, a first adhesive layer, and a multi-layered sealant film, where the first adhesive layer is located between the barrier film and the multi-layered sealant film. In one or more embodiments, the multi-layered sealant film includes three nylon layers, a polyolefin layer, four tie layers, and a sealing layer. In one or more embodiments, the multi-layered sealant film includes three nylon layers, two polyolefin layers, three tie layers, and a sealing layer. Packages that are formed from the multi-ply structures are also provided in which these packages are microwaved in a pressurized vessel. Methods for sterilization are also provided.

50 Claims, 18 Drawing Sheets

(51) Int. Cl.
| | |
|---|---|
| *B32B 7/12* | (2006.01) |
| *B32B 27/32* | (2006.01) |
| *B32B 27/34* | (2006.01) |
| *B32B 27/16* | (2006.01) |
| *B32B 27/36* | (2006.01) |
| *B32B 7/02* | (2019.01) |
| *B32B 27/28* | (2006.01) |
| *B32B 27/18* | (2006.01) |
| *B65B 55/02* | (2006.01) |
| *B65D 65/40* | (2006.01) |
| *B65D 75/00* | (2006.01) |

(52) U.S. Cl.
CPC .............. *B32B 27/16* (2013.01); *B32B 27/18* (2013.01); *B32B 27/28* (2013.01); *B32B 27/32* (2013.01); *B32B 27/34* (2013.01); *B32B 27/36* (2013.01); *B65B 55/027* (2013.01); *B65D 65/40* (2013.01); *B65D 75/008* (2013.01); B32B 2250/05 (2013.01); B32B 2250/24 (2013.01); B32B 2255/10 (2013.01); B32B 2255/20 (2013.01); B32B 2264/102 (2013.01); B32B 2270/00 (2013.01); B32B 2307/308 (2013.01); B32B 2307/31 (2013.01); B32B 2307/4023 (2013.01); B32B 2307/538 (2013.01); B32B 2307/546 (2013.01); B32B 2307/704 (2013.01); B32B 2307/7145 (2013.01); B32B 2307/7242 (2013.01); B32B 2307/7244 (2013.01); B32B 2307/7246 (2013.01); B32B 2307/7265 (2013.01); B32B 2307/732 (2013.01); B32B 2307/734 (2013.01); B32B 2307/748 (2013.01); B32B 2307/75 (2013.01); B32B 2439/40 (2013.01); B32B 2439/46 (2013.01); B32B 2439/70 (2013.01); B32B 2439/80 (2013.01)

(58) Field of Classification Search
CPC ......... B32B 27/28; B32B 27/32; B32B 27/34; B32B 27/36; B65B 55/07; B65D 65/40; B65D 75/008
USPC ........................................................ 383/109
See application file for complete search history.

(56) References Cited

U.S. PATENT DOCUMENTS

| | | | | |
|---|---|---|---|---|
| 6,361,843 | B1* | 3/2002 | Smith | B32B 27/08 428/36.6 |
| 6,599,639 | B2* | 7/2003 | Dayrit | A23L 3/02 428/475.8 |
| 8,075,964 | B2* | 12/2011 | Mueller | A61J 1/10 428/35.4 |
| 9,682,537 | B2* | 6/2017 | Stanley | B65D 85/00 |
| 2004/0037983 | A1* | 2/2004 | Reighard | B32B 27/34 428/36.7 |
| 2004/0175465 | A1 | 9/2004 | Buelow et al. | |
| 2004/0224172 | A1* | 11/2004 | Cable | B32B 27/32 428/476.9 |
| 2006/0172098 | A1 | 8/2006 | Stevenson | |
| 2007/0092744 | A1* | 4/2007 | Di Tella | B32B 27/32 428/475.8 |
| 2008/0050545 | A1* | 2/2008 | Harvey | B32B 27/08 428/34.9 |
| 2012/0141642 | A1* | 6/2012 | Kubik | B32B 7/12 426/133 |
| 2012/0141754 | A1* | 6/2012 | Kubik | B32B 27/00 428/213 |
| 2014/0224836 | A1 | 8/2014 | Campanelli et al. | |
| 2015/0158278 | A1* | 6/2015 | Banerjee | B29C 48/16 428/35.2 |
| 2016/0167855 | A1* | 6/2016 | Umbarger | B32B 7/12 206/524.2 |
| 2019/0240962 | A1* | 8/2019 | Houck | B32B 27/34 |

FOREIGN PATENT DOCUMENTS

| | | |
|---|---|---|
| JP | 2011062977 A | 3/2011 |
| WO | 9533621 A1 | 12/1995 |
| WO | 02074537 A1 | 9/2002 |
| WO | 2013180710 A1 | 12/2013 |
| WO | 2015017967 A1 | 2/2015 |
| WO | 2015171763 A1 | 11/2015 |
| WO | 2016044571 A1 | 3/2016 |

OTHER PUBLICATIONS

International Preliminary Report on Patentability, PCT/US2016/025642, 26 pages, dated Jul. 6, 2017.
International Search Report and Written Opinion, PCT/US17/040248, 12 pages, dated Oct. 24, 2017.

* cited by examiner

MULTI-PLY STRUCTURES, PACKAGES, AND METHODS OF STERILIZATION

CROSS-REFERENCE TO RELATED APPLICATIONS

This application is a 35 U.S.C. § 371 national stage application of PCT Patent Application No., PCT/US2017/040248, filed Jun. 30, 2017, which claims the benefit of priority to U.S. Provisional Patent Application No. 62/400,792, filed Sep. 28, 2016, each of which is incorporated by reference in its entirety.

BACKGROUND

Thermal retort processes have long been used to provide commercial pasteurization and sterilization to improve the microbial safety of refrigerated or shelf-stable food or drink products. In retort processes, the products are heated to temperatures effective to inactivate microorganisms, including spoilage or pathogenic microorganisms, which may be present in the food or drink.

Conventional thermal retort processes generally require high temperature treatment, typically ranging from 121° C. to 132° C. for upwards of 40 minutes including heating, holding, and cooling stages. While acceptable sterilization may be achieved by these processes, thermal treatment for these lengths of time can result in a number of detrimental effects to the food product, including changes in color, aroma, or texture, denaturation or coagulation of protein, and degradation of vitamins and other nutrients.

Given the foregoing drawbacks of conventional retort processes, there is interest in retort processing using microwave energy, such as microwave assisted thermal sterilization (MATS). In MATS, unlike with conventional thermal retort processes, heat is produced directly in the food, thereby substantially reducing the thermal processing time necessary to effectively sterilize the food. As a result, MATS processes, as compared to conventional thermal retort processes, can have, among other attributes, higher throughputs and lower operation costs. Further, the color, texture and other sensory attributes of MATS processed foods can be better compared with those of conventional thermal retorted foods.

Although MATS processes are efficient sterilization processes, they can be harsh on packaging materials because of the temperature and pressure variations involved. MATS processes, therefore, can have an adverse effect on the heat stability of the packaging materials, which can result in distortion (e.g., wrinkles and dimples) of the resulting microwaved packaging materials. Heat distortion of the microwaved packaging materials, however, is undesirable because distorted packaging is unaesthetically appealing to consumers. Therefore, it is desirable to employ suitable packaging material with greater heat stability that can better withstand the processing conditions of MATS processes.

Accordingly, there exists a need to provide improved packaging material, such as improved multi-ply structures, that are capable of being sterilized in a MATS process wherein the resulting microwaved packaging material has less heat distortion as compared to conventional microwaved packaging material.

SUMMARY

In one aspect, multi-ply structures are provided. In one or more embodiments, the multi-ply structure includes a barrier film, which comprises a first polyester layer and a barrier coating layer, a first adhesive layer, and a multi-layered sealant film, wherein the first adhesive layer is located between the barrier film and the multi-layered sealant film. In one embodiment, the multi-layered sealant film includes a first nylon layer and a sealing layer, and a second nylon layer, a third nylon layer, four tie layers, and a first polyolefin layer that are each located between the first nylon layer and the sealant layer, which the first polyolefin layer is located between the first and the second nylon layers, and the third nylon layer is located between the second nylon layer and the sealing layer, and which a first of the four tie layers is located between the first nylon layer and the first polyolefin layer, a second of the four tie layers is located between the first polyolefin layer and the second nylon layer, a third of the four tie layers is located between the second and the third nylon layers, and a fourth of the four tie layers is located between the third nylon layer and the sealing layer. In another embodiment, the multi-layered sealant film includes a first nylon layer and a sealing layer, and a second nylon layer, a third nylon layer, three tie layers, a first polyolefin layer, and a second polyolefin layer that are each located between the first nylon layer and the sealant layer, which the first and the second polyolefin layers are located between the first and the second nylon layers and the second and the third nylon layers are located between the second polyolefin layer and the sealing layer, and which a first of the three tie layers is located between the first nylon layer and the first polyolefin layer, a second of the three tie layers is located between the second polyolefin layer and the second nylon layer, and a third of the three tie layers is located between the third nylon layer and the sealing layer.

In another aspect, packages are provided. In one or more embodiments, the package includes the multi-ply structure, as described above, which defines an interior space of the package, and a product disposed within the interior space. In one or more embodiments, the package includes a container body having a rim, which the container body defines an interior space of the package, product disposed within the interior space, and the multi-ply structure, as described above, that is affixed to the rim.

In yet another aspect, methods for sterilization are provided. In one or more embodiments, the method includes feeding a package, into a pressurized vessel, which the package includes the multi-ply structure, as described above, and product is disposed within an interior space of the package, and exposing the package and the product within the pressurized vessel to one or more cycles of microwave energy.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale.

DETAILED DESCRIPTION

Improved multi-ply structures have been developed that address one or more challenges that arise with sterilizing conventional multi-ply structures via microwave-assisted thermal sterilization (MATS) processes. The present multi-ply structures include a multi-layered sealant film having at least one or more nylon layers, which advantageously increase the heat stability of the multi-ply structures such that, during the MATS process, these structures have greater resistance to heat distortion. The resulting microwaved multi-ply structures, therefore, have less heat distortion as compared to conventional microwaved multi-ply structures, and, consequently, are more aesthetically pleasing. Further, in instances where the multi-layered sealant films of the present multi-ply structures include, in addition to the one or more nylon layers, one or more polyolefins layers having one or more polyolefins with a high melting temperature (i.e., a melting temperature of at least about 160° C. or greater), heat stability can be further increased.

Several embodiments of multi-ply structures and methods for making the structures, packages and methods for making the packages, and methods of sterilization are described herein. Parameters of different steps, components, and features of the embodiments are described separately, but may be combined consistently with this description of claims, to enable other embodiments as well to be understood by those skilled in the art. Various terms used herein are likewise defined in the description which follows.

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In embodiments, "about" can be used to mean, for example, within 10% of the recited value, within 5% of the recited value, or within 2% of the recited value.

Multi-Ply Structures

In accordance with the description, multi-ply structures that include at least a barrier film, which includes a first polyester layer and a barrier coating layer, a first adhesive layer, and a multi-layered sealant film have been developed.

It is also contemplated within this disclosure that in certain embodiments, the polyester layer may be replaced with a biaxially oriented nylon layer.

Figure 1:
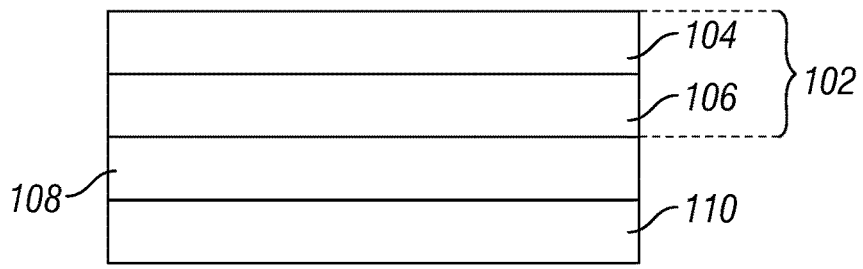
FIG. 1 is a cross-sectional view of a multi-ply structure in accordance with an embodiment of the present disclosure.

One embodiment of a multi-ply structure is shown in FIG. 1. The multi-ply structure 100 includes a barrier film 102, which includes a first polyester layer 104 and a barrier coating layer 106. The multi-ply structure 100 further includes a multi-layered sealant film 110 and a first adhesive layer 108. The first adhesive layer 108 is located between the barrier film 102 and the multi-layered sealant film 110. In this embodiment, the first polyester layer 104 is the outermost layer of the multi-ply structure 100.

In some embodiments, the multi-ply structure is flexible. In some embodiments, the multi-ply structure is substantially polymeric. In certain embodiments, the multi-ply structure is flexible and substantially polymeric.

As used herein, "substantially polymeric" means having a polymer content of at least 90% based on weight of the multi-ply structure. For example, in some embodiments, the multi-ply structure has a polymer content of about 90% to about 99.9% based on weight of the multi-ply structure. In some embodiments, the multi-ply structure has a polymer content of about 90% to about 95% based on weight of the multi-ply structure. In some embodiments, the multi-ply structure has a polymer content of about 95% to about 99.9% based on weight of the multi-ply structure.

In some embodiments, the multi-ply structure does not comprise a microwave energy interactive material, such as those described in International Publication No. WO 2012/148895 (e.g., foil patch, patterned foil, a susceptor, or combinations thereof).

In some embodiments, the barrier film has a thickness from about 36 gauge to 120 gauge, however, the thickness of the barrier film can vary depending on desired package specifications.

As used herein, "outermost layer" of the multi-ply structure means the first layer that is viewed from the outside of the multi-ply structure and will typically be the outermost layer of a package made with such a structure (e.g., a pouch) or the outermost layer of the portion of a package made with such structure (e.g., lidding).

As used herein, a "polyester layer" is a layer that predominately comprises one or more polyesters. That is, a polyester layer comprises one or more polyesters in an amount of at least 50% based on weight of the polyester layer. In one embodiment, the polyester layer comprises one or more polyesters in an amount of about 80% to about 100% based on weight of the polyester layer. In another embodiment, the polyester layer comprises one or more polyesters in an amount of about 95% to about 100% based on weight of the polyester layer.

A non-limiting example of a suitable polyester includes polyethylene terephthalate (PET), such as biaxially oriented PET (BOPET). It is also contemplated that the one or more polyesters do not include any other polyesters other than PET.

As used herein, a "barrier coating layer" is a layer that predominately comprises one or more barrier coating materials. That is, a barrier coating layer comprises one or more barrier coating materials in an amount of at least 50% based on weight of the barrier coating layer. In one embodiment, the barrier coating layer comprises one or more barrier coating materials in an amount of about 80% to about 100% based on weight of the barrier coating layer. In another embodiment, the barrier coating layer comprises one or more barrier coating materials in an amount of 100% based on weight of the barrier coating layer. Non-limiting examples of suitable barrier coating materials include aluminum oxide, silicon oxide, nanoclay, and the like, and any combination thereof.

As used herein, an "adhesive layer" is a layer that adheres or bonds different films and/or layers of the multi-ply structure together. Non-limiting examples of suitable adhesive layer materials are solvent-based adhesives, water-based adhesives, and solvent-less adhesives. Suitable adhesives include, but are not limited to, solvent-based polyurethane adhesives.

In embodiments, an adhesive layer is not used to bond the layers of the barrier film together. That is, the barrier film of the present multi-ply structures does not comprise an adhesive layer. For example, in some embodiments, the barrier coating layer is vacuum deposited, e.g., by physical or chemical vapor deposition, onto a surface of the first polyester layer.

Inventors have discovered that the present multi-ply structures have higher heat stability, and consequently greater heat resistance, as compared to conventional multi-ply structures when undergoing a MATS process. Thus, the resulting microwaved multi-ply structures of the present disclosure have less heat distortion than that of conventional microwaved multi-ply structures.

Further, random co-polymer polypropylene (RCPP) is typically the type of polypropylene used as the multi-layered sealant film of conventional multi-ply structures for conventional thermal retort applications. It has been additionally discovered that in instances where the present multi-layered sealant films include, in addition to one or more nylon layers, one or more polyolefin layers having one or more polyolefins with higher melting temperatures than RCPP, the heat stability of the present multi-ply structures is further enhanced, and therefore the heat distortion of the resulting microwaved multi-ply structures is further minimized.

In embodiments, the amount of heat distortion of the present microwaved multi-ply structures can be quantified by the amount of surface roughness. Surface roughness is herein defined as the vertical deviations of a real surface from its primary form (reference surface), and can be determined using ISO 25178. The greater the deviation, the greater the surface roughness of the multi-ply structure.

As used herein, the term "microwaved" when used to modify a multi-ply structure or a package means that the structure or the package was microwaved, i.e., exposed to microwave energy, in a pressurized vessel. That is, the multi-ply structures or the packages of the present disclosure underwent a MATS process, such as those described herein and in U.S. Pat. Nos. 5,436,432, 5,750,966, 7,119,313, 7,230,217, 9,066,376, 9,179,505, and 9,271,338, and in International Publication Nos. WO 2016/044571, WO 2016/100539, and WO 2015/171763, all of which are incorporated herein by reference. In some embodiments, the pressurized vessel includes a fluid medium. In some embodiments, the pressurized vessel includes a liquid and the multi-ply structure or the package is at least partially immersed in the liquid.

In embodiments, the microwaved multi-ply structures or packages of the present disclosure are sterilized during the MATS process. Additionally in embodiments where a product is disposed within the package, the product is sterilized during the MATS process. In certain embodiments, the product is a food or drink product, and the product is also pasteurized during the MATS process.

As used herein, a "conventional multi-ply structure" or "conventional microwaved multi-ply structure" is a structure that does not include a combination of at least a barrier film, a first adhesive layer, and a multi-layered sealant film in which the multi-layered sealant film comprises at least one or more nylon layers and one or more polyolefin layers. For example, in some embodiments, a conventional multi-ply structure or conventional microwaved multi-ply structure has a multi-layered sealant film that includes polypropylene and not nylon.

As used herein, a "comparative surface roughness" when used herein to refer to the surface roughness of a "conventional microwaved multi-ply structure" is measured under the same conditions and parameters as the measured surface roughness value of the microwaved multi-ply structure in accordance with the present disclosure.

In some embodiments, the microwaved multi-ply structure has a surface roughness from about 0 µm to 25 µm. In one embodiment, the microwaved multi-ply structure has a surface roughness from about 1 µm to 20 µm. In another embodiment, the microwaved multi-ply structure has a surface roughness from about 2 µm to 6 µm. In other embodiments, the microwaved multi-ply structure has a surface roughness of 0 µm, 0.01 µm, 0.1 µm, 0.5 µm, 1 µm, 1.5 µm, 2 µm, 2.5 µm, 3 µm, 3.5 µm, 4 µm, 4.5 µm, 5 µm, 5.5 µm, 6 µm, 6.5 µm, 7 µm, 7.5 µm, 8 µm, 8.5 µm, 9 µm, 9.5 µm, 10 µm, 10.5 µm, 11 µm, 11.5 µm, 12 µm, 12.5 µm, 13 µm, 13.5 µm, 14 µm, 14.5 µm, 15 µm, 15.5 µm, 16 µm, 16.5 µm, 17 µm, 17.5 µm, 18 µm, 18.5 µm, 19 µm, 19.5 µm, 20 µm, 20.5 µm, 21 µm, 21.5 µm, 22 µm, 22.5 µm, 23 µm, 23.5 µm, 24 µm, 24.5 µm, or 25 µm. In other embodiments, the microwaved multi-ply structure of this disclosure also may have a surface roughness value between any of these recited surface roughness values.

In embodiments, the present microwaved multi-ply structures have a surface roughness that is lower than a comparative surface roughness of a conventional microwaved multi-ply structure. For example, in some embodiments, the microwaved multi-ply structure has a surface roughness that is up to 100% lower than a comparative surface roughness of a conventional microwaved multi-ply structure. In one embodiment, the microwaved multi-ply structure has a surface roughness that is between 0% and 100% lower than a comparative surface roughness of a conventional microwaved multi-ply structure. In one embodiment, the microwaved multi-ply structure has a surface roughness that is about 10% to about 99% lower than a comparative surface roughness of a conventional microwaved multi-ply structure. In another embodiment, the microwaved multi-ply structure has a surface roughness that is about 20% to about 80% lower than a comparative surface roughness of a conventional microwaved multi-ply structure. In other embodiments, the microwaved multi-ply structure has a surface roughness that is 0.01%, 0.1%, 0.5%, 1%, 5%, 10%, 15%, 20%, 25%, 30%, 35%, 40%, 45%, 50%, 55%, 60%, 65%, 70%, 75%, 80%, 85%, 90%, 95%, 99%, or 100% lower than a comparative surface roughness of a conventional microwaved multi-ply structure. The microwaved multi-ply structure of this disclosure also may have a surface roughness that is lower than a comparative surface roughness of the conventional microwaved multi-ply structure at a percent value in a range between any of these recited percent values.

In embodiments, the present multi-ply structures include a multi-layered sealant film, which includes at least a first nylon layer, a first polyolefin layer, and a sealing layer. For example, the multi-layered sealant film 110 of FIG. 1, which is further illustrated in FIG. 2, includes a first polyolefin layer 112, a first nylon layer 114, and a sealing layer 116 in which the first nylon layer 114 is located between the first polyolefin layer 112 and the sealing layer 116 The multi-layered sealant film 110 further includes two tie layers 118, 120 in which the first tie layer 118 is located between the first polyolefin layer 112 and the first nylon layer 114, and the second tie layer 120 is located between the first nylon layer 114 and the sealing layer 116.

Figure 2:
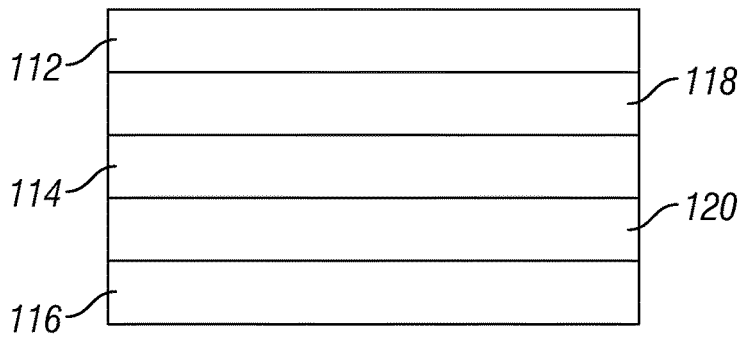
FIG. 2 is a cross-sectional view of the multi-layered sealant film of the multi-ply structure illustrated in FIG. 1.
Figure 3:
FIG. 3 is a cross-sectional view of a multi-layered sealant film in accordance with an embodiment of the present disclosure.

As used herein, the term "outermost layer" of the multi-layered sealant film means the layer that, when incorporated into a multi-ply structure, is the adjacent to the first adhesive layer of the multi-ply structure. For example, the outermost layer of the multi-layered sealant film 110 in FIGS. 1 and 2 is the first polyolefin layer 112.

As used herein, a "polyolefin layer" is a layer that predominately comprises one or more polyolefins. That is, a polyolefin layer comprises one or more polyolefins in an amount of at least 50% based on weight of the polyolefin layer. In one embodiment, the polyolefin layer comprises one or more polyolefins in an amount of about 90% to about 100% based on weight of the polyolefin layer. In one embodiment, the polyolefin layer comprises one or more polyolefins in an amount of about 95% to about 100% based on weight of the polyolefin layer.

Non-limiting examples of suitable polyolefins include one or more random copolymer polypropylenes (RCPP), one or more homopolymer polypropylenes, one or more thermoplastic olefins (TPO), one or more high crystalline polypropylenes (HCPP), and any combination thereof.

As used herein, a "nylon layer" of the multi-layered sealant film is a layer that predominately comprises one or more nylons. That is, a nylon layer comprises one or more nylons in an amount of at least 50% based on weight of the nylon layer. In one embodiment, the nylon layer comprises one or more nylons in an amount of about 80% to about 100% based on weight of the nylon layer. In another embodiment, the nylon layer comprises one or more nylons in an amount of about 95% to about 100% based on weight of the nylon layer. Non-limiting examples of suitable nylons do not include biaxially oriented nylons. Non-limiting examples of suitable nylon materials include polyamides, such as nylon 6, nylon 6/66, and nylon 66, and the like, and combinations thereof.

As used herein, a tie layer is an extruded resin layer that aids in adhering or bonding dissimilar layers of a co-extruded film together. In some embodiments, one or more tie layers are included in the multi-layered sealant film to adhere dissimilar layers of the multi-layered sealant film together. For purposes of this disclosure, even though a tie layer aids in adhering and bonding, it is not an adhesive layer as defined herein.

Non-limiting examples of suitable tie layer materials include anhydride-modified polyolefins (e.g., anhydride-modified polypropylene or anhydride-modified polyethylene), modified ethylene vinyl acetate, anhydride-modified ethylene acrylate, acid/acrylate-modified ethylene vinyl acetate, anhydride-modified ethylene vinyl acetate, anhydride-modified ethylene methyl acrylate, ethylene methyl acrylate (EMA), and combinations thereof, and any of the foregoing materials in combination with polyolefins, such as polypropylene.

The type of materials in a tie layer is based, at least in part, on the materials of the opposing layers of the multi-layered sealant film being bonded via the tie layer. For example, where a first tie layer is used to bond a first polyolefin layer and a first nylon layer, the first tie layer may comprise an anhydride-modified polyolefin, and where a second tie layer is used to bond a second polyolefin layer and a second nylon layer, the second tie layer may comprise an anhydride-modified polyolefin. In such an embodiment, for example, the first tie layer may comprise an anhydride-modified polypropylene and the second tie layer may comprise an anhydride-modified polypropylene.

The multi-layered sealant films described herein may be formed by any of the conventional processes for making multi-layered sealant films, including blown extrusion, cast extrusion, or the like. It should be noted that any layer of the multi-layered sealant film described herein may be formed using a film line with single or multiple extruders.

In certain embodiments, the multi-layered sealant film has a thickness from about 1 mil to about 8 mil. In one embodiment, the multi-layered sealant film has a thickness from about 2 mil to about 5 mil. In other embodiments, the multi-layered sealant film has a thickness of 1 mil, 1.5 mil, 2 mil, 2.5 mil, 3 mil, 3.5 mil, 4 mil, 4.5 mil, 5 mil, 5.5 mil, 6 mil, 6.5 mil, 7 mil, 7.5 mil, or 8 mil. In other embodiments, the multi-layered sealant film of this disclosure also may have a thickness between any of these recited thickness values.

In some embodiments, the multi-layered sealant film 110 may include additional layers, such as additional one or more polyolefin layers, additional one or more nylon layers, or a combination thereof. Examples of these multi-layered sealant films are illustrated in FIGS. 3-8 and may be the multi-layered sealant film of any of the present multi-ply structures described herein. It is also contemplated that any of these additional layers may be omitted from the multi-layered sealant film.

In some embodiments, the multi-layered sealant film further comprises additional one or more nylon layers. For example, in FIG. 3, the multi-layered sealant film 110A includes a first polyolefin layer 112, two nylon layers 114, 122, a sealing layer 116, and three tie layers 118, 120, 124. The two nylons layers 114, 122 are located between the first polyolefin layer 112 and the sealing layer 116, wherein the first tie layer 118 is between the first polyolefin layer 112 and the first nylon layer 114, the second tie layer 120 is between the first and the second nylon layers 114, 122, and the third tie layer 124 is between the second nylon layer 122 and the sealing layer 116. In this embodiment, the first polyolefin layer 112 is the outermost layer of the multi-layered sealant film 110A.

As used herein, the term "adjacent" means contiguous.

Figure 5:
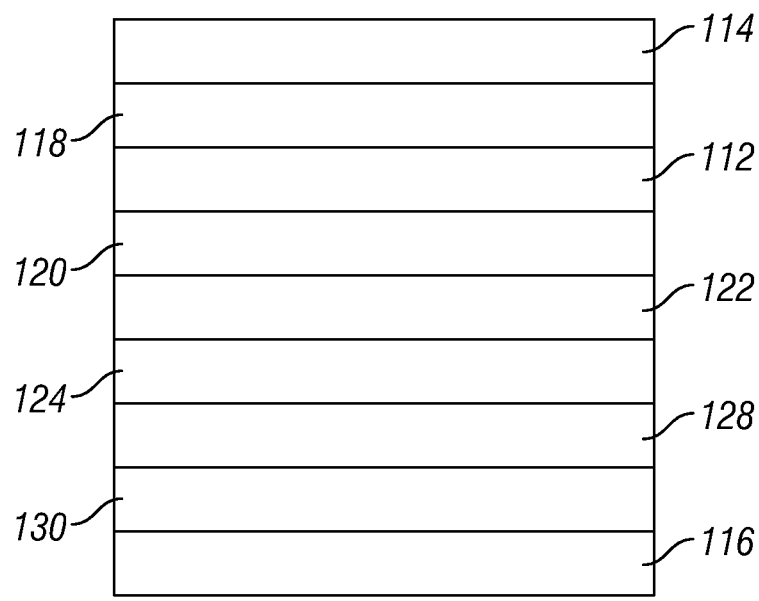
FIG. 5 is a cross-sectional view of a multi-layered sealant film in accordance with an embodiment of the present disclosure.

FIG. 5 is another exemplary embodiment of a multi-layered sealant film that includes additional one or more nylon layers. The multi-layered sealant film 110C includes a first polyolefin layer 112, three nylon layers 114, 122, 128, a sealing layer 116, and four tie layers 118, 120, 124, 130. The first polyolefin layer 112 and the second and the third nylon layers 122, 128 are located between the first nylon layer 114 and the sealing layer 116, wherein the first tie layer 118 is between the first nylon layer 114 and the first polyolefin layer 112, the second tie layer 120 is between the first polyolefin layer 112 and the second nylon layer 122, the third tie layer 124 is between the second and the third nylon layers 122, 128, and the fourth tie layer 130 is between the third nylon layer 128 and the sealing layer 116. In this embodiment, the first nylon layer 114 is the outermost layer of the multi-layered sealant film 110C.

In some embodiments, the multi-layered sealant film further comprises additional one or more polyolefin layers and one or more nylon layers. For example, in FIG. 4, the multi-layered sealant film 110B includes two polyolefin layers 112, 126, two nylon layers 114, 122, a sealing layer 116, and two tie layers 118, 120. The two nylons layers 114, 122 are located between the first polyolefin layer 112 and the sealing layer 116 and the second polyolefin layer 126 is located between the second nylon layer 122 and the sealing layer 116. In this illustrated embodiment, the first tie layer 118 is between the first polyolefin layer 112 and the first nylon layer 114 and the second tie layer 120 is between the second nylon layer 122 and the second polyolefin layer 126. In this embodiment, the first polyolefin layer 112 is the outermost layer of the multi-layered sealant film 110B.

Figure 6:
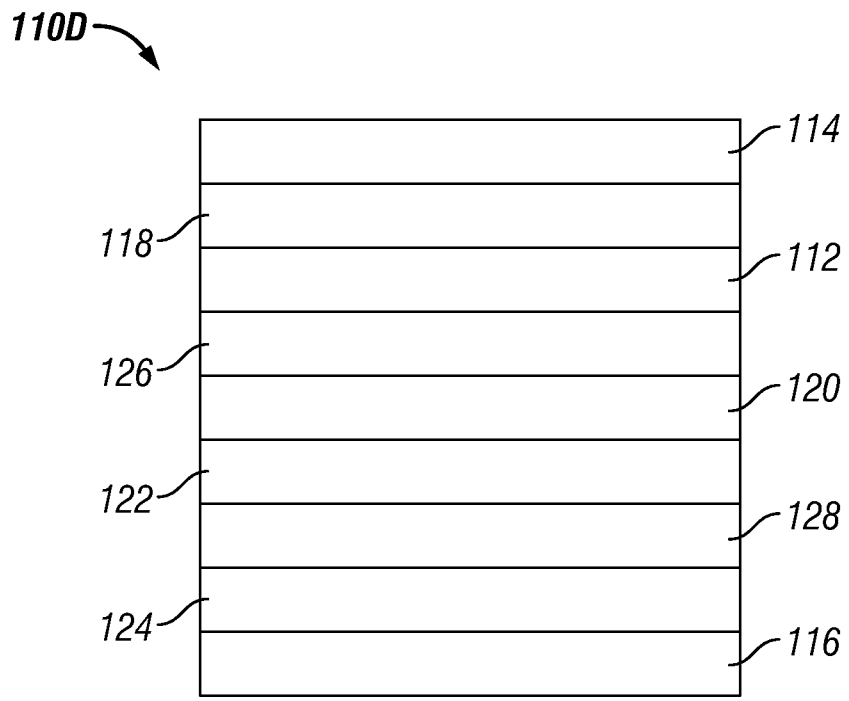
FIG. 6 is a cross-sectional view of a multi-layered sealant film in accordance with an embodiment of the present disclosure.

FIG. 6 is another exemplary embodiment of a multi-layered sealant film in which the multi-layered sealant film includes additional one or more polyolefin layers and one or more nylon layers. The multi-layered sealant film 110D includes two polyolefin layers 112, 126, three nylon layers 114, 122, 128, a sealing layer 116, and three tie layers 118, 120, 124. The two polyolefin layers 112, 126 and the second and the third nylon layers 122, 128 are located between the first nylon layer 114 and the sealing layer 116, wherein the first tie layer 118 is between the first nylon layer 114 and the first polyolefin layer 112, the second tie layer 120 is between the second polyolefin layer 126 and the second nylon layer 122, and the third tie layer 124 is between the third nylon layer 128 and the sealing layer 116. In this embodiment, the first nylon layer 114 is the outermost layer of the multi-layered sealant film 110D.

Figure 7:
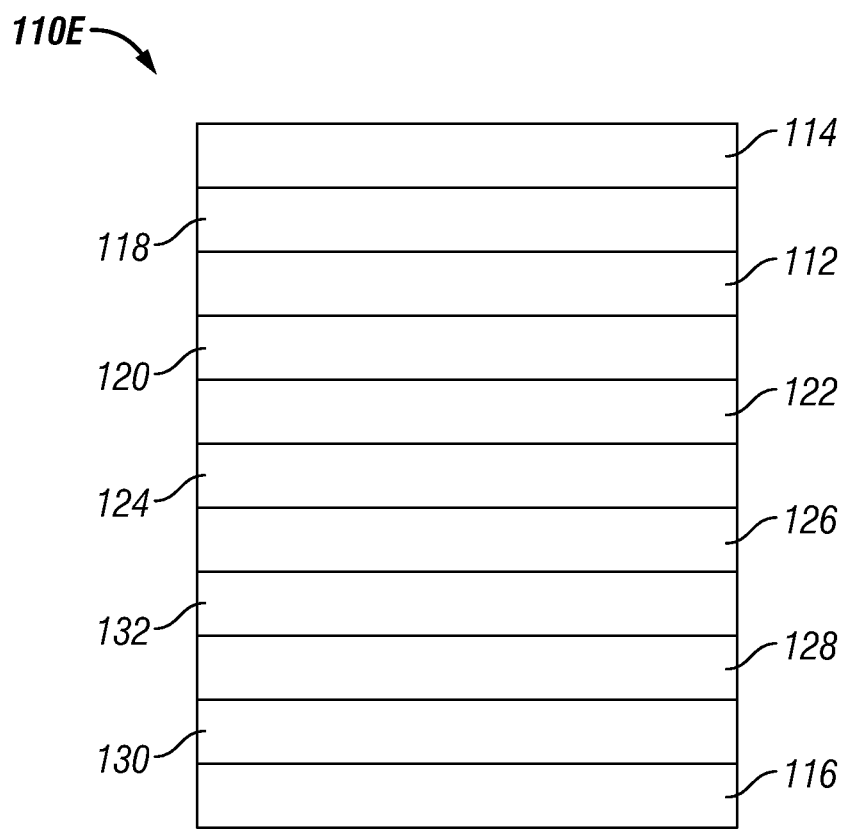
FIG. 7 is a cross-sectional view of a multi-layered sealant film in accordance with an embodiment of the present disclosure.

FIG. 7 illustrates a possible variation of the multi-layered sealant film 110C shown in FIG. 5. The multi-layered sealant film 110E includes a second polyolefin layer 126 and a fifth tie layer 132. The second polyolefin layer 126 is located between the third and fifth tie layers 124, 132, and the fifth tie layer 132 is located between the second polyolefin layer 126 and the third nylon layer 128. In this embodiment, the first nylon layer 114 is adjacent to the first adhesive layer of the multi-ply structure.

Figure 8:
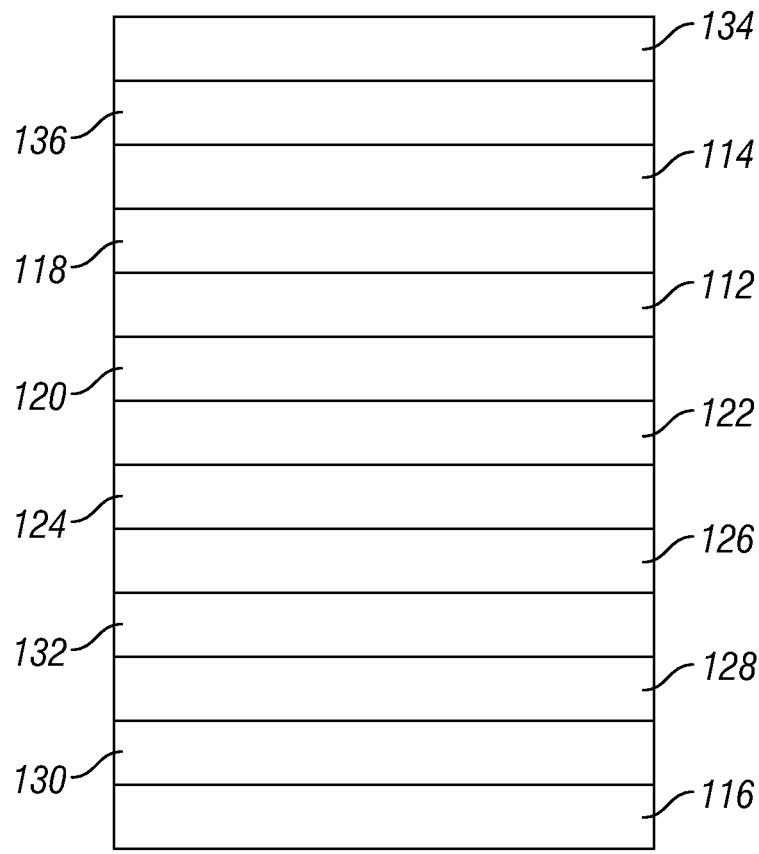
FIG. 8 is a cross-sectional view of a multi-layered sealant film in accordance with an embodiment of the present disclosure.

FIG. 8 illustrates a possible variation of the multi-layered sealant film 110E shown in FIG. 7. The multi-layered sealant film 110F includes a third polyolefin layer 134 and a sixth tie layer 136. The sixth tie layer 136 is located between the third polyolefin layer 134 and the first nylon layer 114, and the third polyolefin layer 136 is the outermost layer of the multi-layered sealant film 110F.

In embodiments, the sealing layer of the multi-layered sealant film is in the innermost layer of the multi-ply structure.

As used herein "innermost layer" means the last layer that is viewed from the outside of a reverse laminated structure and will typically be a layer that is in proximate to or in contact with product contained in a package made with such a structure (e.g., pouch) or in a package having a portion made with such structure (e.g., lidding).

In some embodiments, the sealing layer comprises an easy peel layer. In one embodiment, the easy-peel layer comprises a blend of a polypropylene, a polyethylene, an antiblock agent (e.g., diatomaceous earth), and a slip agent (e.g., erucamide). In another embodiment, the easy-peel layer comprises a blend of a polypropylene, an ethylene methyl acrylate (EMA), an antiblock agent (e.g., diatomaceous earth), and a slip agent (e.g., erucamide).

In some embodiments, the sealing layer includes one or more random copolymer polypropylenes, one or more homopolymer polypropylenes, one or more terpolymers, or a combination thereof.

In certain embodiments where the multi-layered sealant film does not comprise an easy-peel layer, the multi-layered sealant film does not comprise polyethylene.

In any of the foregoing multi-layered sealant film embodiments, the multi-layered sealant film, in some embodiments, does not comprise solvent-based, water-based, or solvent-less adhesives. In other embodiments, the multi-layered sealant film of any of the foregoing multi-layered sealant film embodiments is substantially free of adhesive, i.e., solvent-based adhesives, water-based adhesives, and/or solvent-less adhesives. As used herein "substantially free" means that the total amount of adhesive present within the multi-layered sealant film is less than about 1% by weight of the multi-ply structure.

In certain embodiments, the multi-ply structure further includes additional layers, such as ink layers, nylon layers, additional adhesive layers, additional polyester layers, or any combination thereof. It is also contemplated that any of these additional layers may be omitted from the multi-ply structure.

Figure 9:
FIG. 9 is a cross-sectional view of a multi-ply structure in accordance with an embodiment of the present disclosure.

In some embodiments, the multi-ply structure further comprises an ink layer. For example, as illustrated in FIG. 9, the multi-ply structure 900, which is a variation of the multi-ply structure in FIG. 1, has an ink layer 138 that is located between the barrier film 102 and the multi-layered sealant film 110. In this embodiment, the ink layer 138 is adjacent to the barrier coating layer 106 and the first polyester layer 104 is the outermost layer of the multi-ply structure 900. Non-limiting examples of suitable ink materials include water-based inks, solvent-based inks, and the like, and combinations thereof.

Figure 10:
FIG. 10 is a cross-sectional view of a multi-ply structure in accordance with an embodiment of the present disclosure.

In certain embodiments, the multi-ply structure comprises one or more nylon layers and one or more additional adhesive layers. For example, as illustrated in FIG. 10, the multi-ply structure 1000, which is a variation of the multi-ply structure 100 in FIG. 1, further includes a second adhesive layer 140 and a first nylon layer 142. The second adhesive layer 140 is located between the barrier film 102 and the first nylon layer 142, whereas the first nylon layer 142 is located between the first and the second adhesive layers 108, 140. In this embodiment, the second adhesive layer 140 is adjacent to the barrier coating layer 106 and the first polyester layer 104 is the outermost layer of the multi-ply structure 1000.

As used herein, a "nylon layer" of the multi-ply structure that is separate from the multi-layered sealant film (i.e., a nylon layer that is not part of the multi-layered sealant film) is a layer that predominately comprises one or more nylons. That is, a nylon layer comprises one or more nylons in an amount of at least 50% based on weight of the nylon layer. In one embodiment, the nylon layer comprises one or more nylons in an amount of about 80% to about 100% based on weight of the nylon layer. In another embodiment, the nylon layer comprises one or more nylons in an amount of about 95% to about 100% based on weight of the nylon layer. Non-limiting examples of suitable nylons include biaxially oriented nylons, cast nylons, and the like, and combinations thereof. For example, in one embodiment, the one or more nylon layers are biaxially oriented nylon. Non-limiting examples of suitable nylon materials includes polyamides, such as nylon 6, nylon 66, and nylon 6,66.

Figure 11:
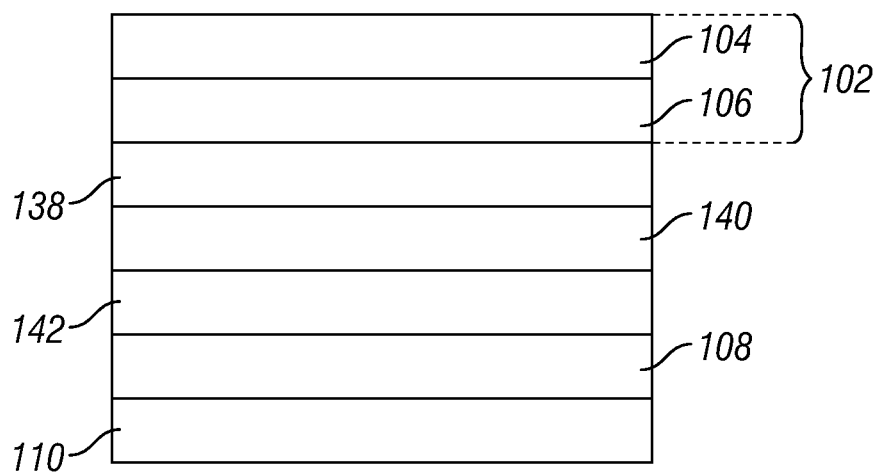
FIG. 11 is a cross-sectional view of a multi-ply structure in accordance with an embodiment of the present disclosure.
Figure 12:
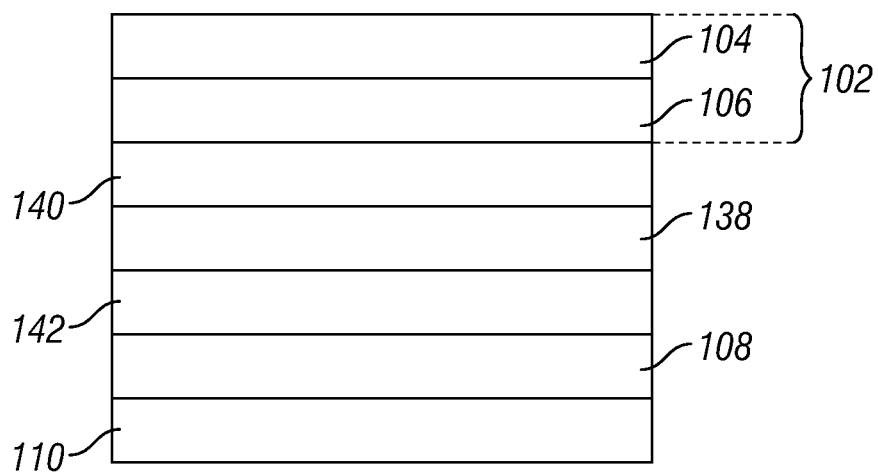
FIG. 12 is a cross-sectional view of a multi-ply structure in accordance with an embodiment of the present disclosure.

FIGS. 11 and 12 illustrate possible variations of the multi-ply structure 1000 shown in FIG. 10. The multi-ply structures 1100 and 1200 both include an ink layer 138. In FIG. 11, the ink layer 138 is located between the barrier film 102 and the second adhesive layer 140. In this embodiment, the ink layer 138 is adjacent to the barrier coating layer 106. In FIG. 12, the ink layer 138 is located between the second adhesive layer 140 and the first nylon layer 142. In both FIGS. 11 and 12, the first polyester layer 104 is the outermost layer of the multi-ply structures 1100 and 1200, respectively.

Figure 13:
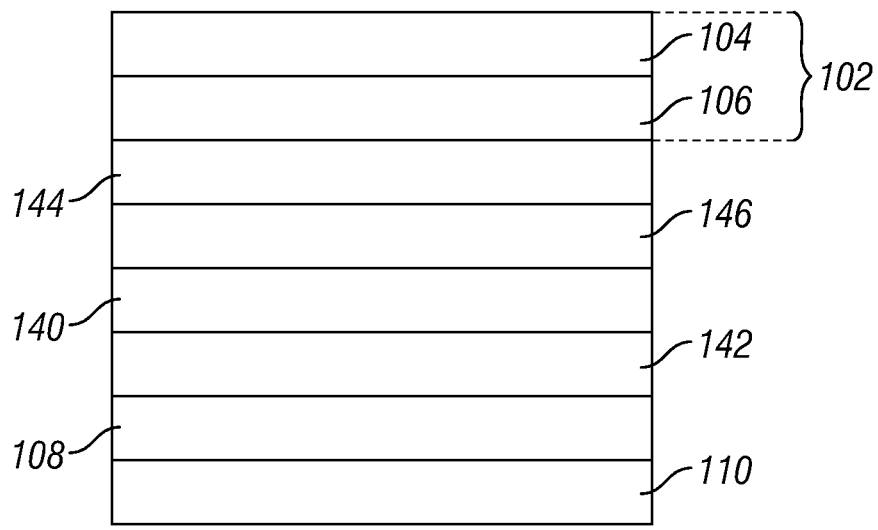
FIG. 13 is a cross-sectional view of a multi-ply structure in accordance with an embodiment of the present disclosure.

Another embodiment of the multi-ply structure is illustrated in FIG. 13. The multi-ply structure 1300 is similar to the multi-ply structure 1000 in FIG. 10, except that the multi-ply structure 1300 further includes a third adhesive layer 144 and a second nylon layer 146. The third adhesive layer 144 is located between the barrier film 102 and the second nylon layer 146, whereas the second nylon layer 146 is located between the second and the third adhesive layers 140, 144. In this embodiment, the third adhesive layer 144 is adjacent to the barrier coating layer 106 and the first polyester layer 104 is the outermost layer of the multi-ply structure 1300.

Figure 14:
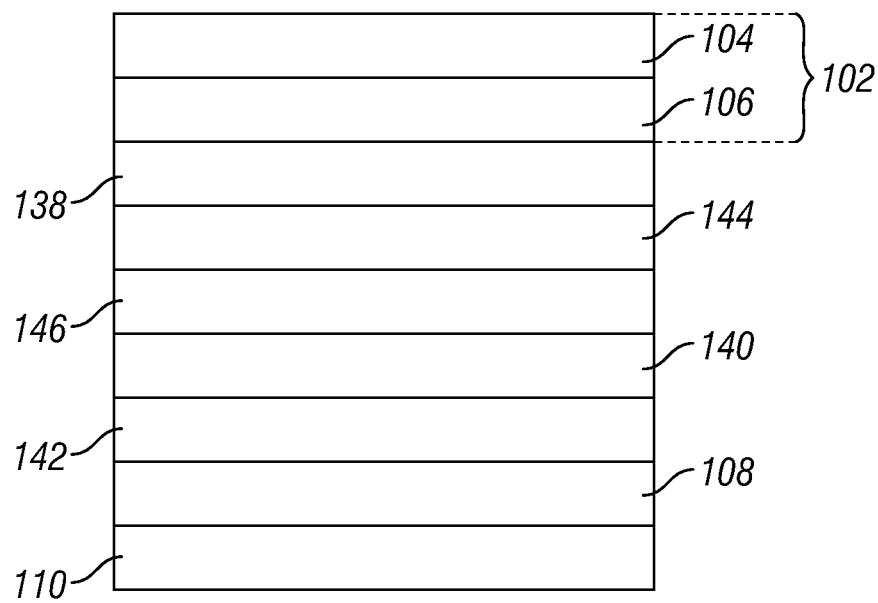
FIG. 14 is a cross-sectional view of a multi-ply structure in accordance with an embodiment of the present disclosure.
Figure 15:
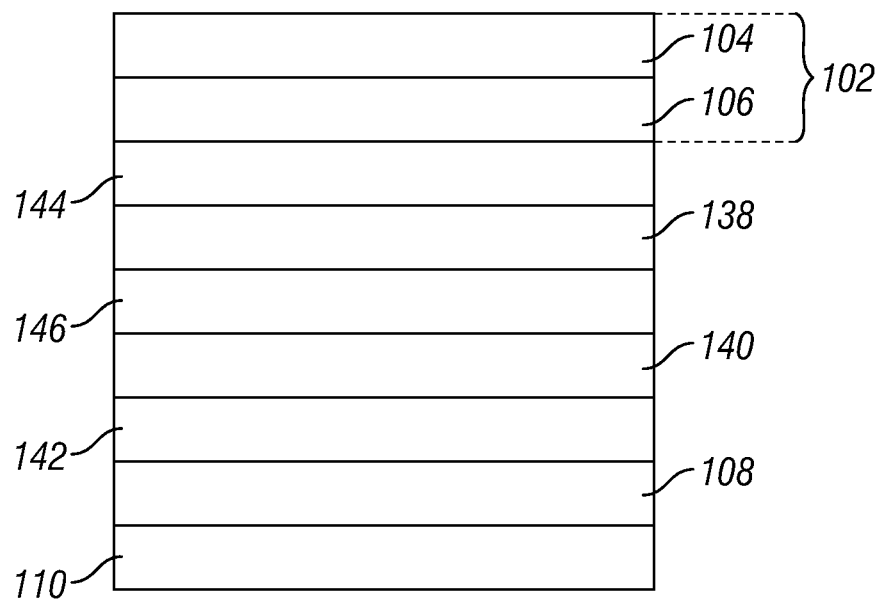
FIG. 15 is a cross-sectional view of a multi-ply structure in accordance with an embodiment of the present disclosure.

FIGS. 14 and 15 illustrate possible variations of the multi-ply structure 1300 shown in FIG. 13. The multi-ply structures 1400 and 1500 both include an ink layer 138. In FIG. 14, the ink layer 138 is located between the barrier film 102 and the third adhesive layer 144. In this embodiment, the ink layer 138 is adjacent to the barrier coating layer 106. In FIG. 15, the ink layer 138 is located between the third adhesive layer 144 and the second nylon layer 146. In both FIGS. 14 and 15, the first polyester layer 104 is the outermost layer of the multi-ply structures 1400 and 1500, respectively.

In some embodiments, each nylon layer of the one or more nylon layers has a thickness from about 48 gauge to about 100 gauge. In one embodiment, each of the one or more nylon layers has a different thickness. In another embodiment, each of the one or more nylon layers has equal thickness.

Figure 16:
FIG. 16 is a cross-sectional view of a multi-ply structure in accordance with an embodiment of the present disclosure.

In certain embodiments, the multi-ply structure comprises one or more additional polyester layers and one or more additional adhesive layers. For example, as illustrated in FIG. 16, the multi-ply structure 1600, which is a variation of the multi-ply structure 100 in FIG. 1, further includes a second adhesive layer 140 and a second polyester layer 150. The second adhesive layer 140 is located between the barrier film 102 and the second polyester layer 150. In this embodiment, the second adhesive layer 140 is adjacent to the first and second polyester layers 104, 150 and the second polyester layer 150 is the outermost layer of the multi-ply structure 1600. In another embodiment, as illustrated in FIG. 18, the second adhesive layer 140 is adjacent to the barrier coating layer 106, rather than the first polyester layer 104.

Figure 17:
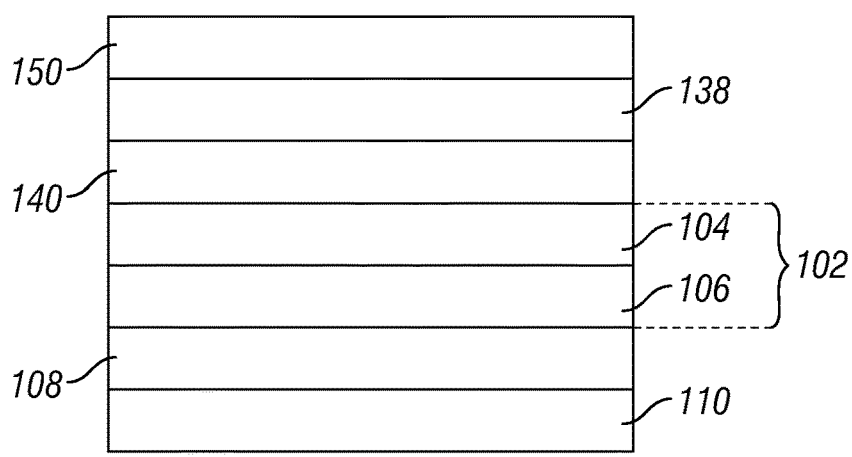
FIG. 17 is a cross-sectional view of a multi-ply structure in accordance with an embodiment of the present disclosure.
Figure 18:
FIG. 18 is a cross-sectional view of a multi-ply structure in accordance with an embodiment of the present disclosure.
Figure 19:
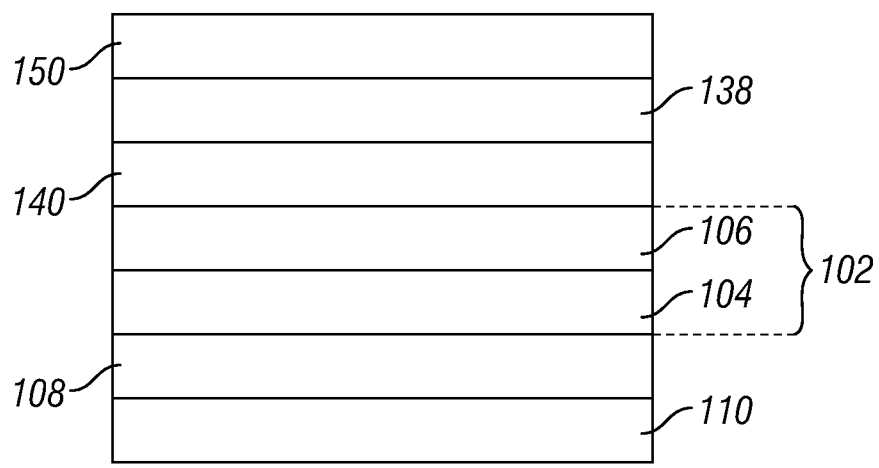
FIG. 19 is a cross-sectional view of a multi-ply structure in accordance with an embodiment of the present disclosure.

FIGS. 17 and 19 illustrate possible variations of the multi-ply structures 1600 and 1800 shown in FIGS. 16 and 18, respectively. The multi-ply structures 1700 and 1900 both include an ink layer 138 that is located between the second polyester layer 150 and the second adhesive layer 140.

In embodiments, the one or more additional polyester layers are independent of the barrier film. That is, the one or more additional polyester layers are omitted from the barrier film. In some embodiments, each of the one or more additional polyester layers has a thickness from about 36 gauge to 120 gauge. In one embodiment, each of the one or more additional polyester layers has a different thickness. In another embodiment, each of the one or more additional polyester layers has equal thickness.

Figure 20:
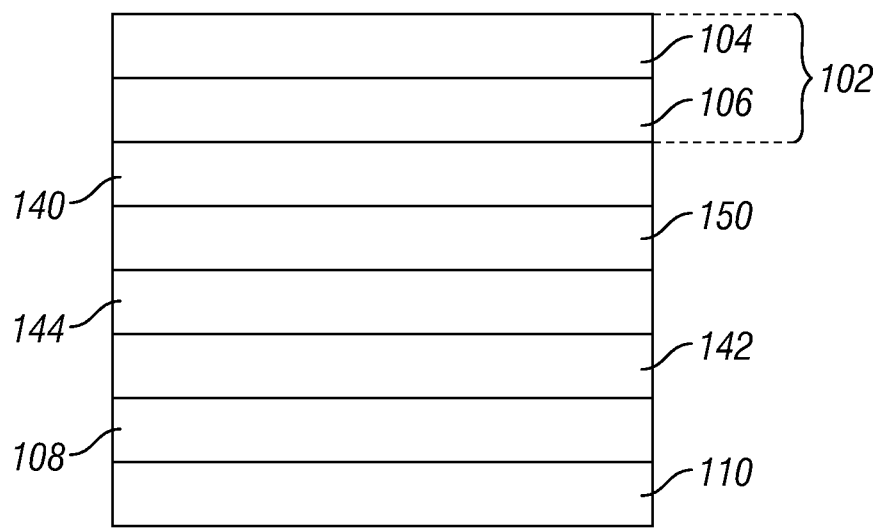
FIG. 20 is a cross-sectional view of a multi-ply structure in accordance with an embodiment of the present disclosure.

In some embodiments, the multi-ply structure comprises one or more nylon layers, one or more additional polyester layers, and one or more additional adhesive layers. For example, as illustrated in FIG. 20, the multi-ply structure 2000, which is a variation of the multi-ply structure 1000 in FIG. 20, further includes a first nylon layer 142, a second polyester layer 150, and two additional adhesive layers 140, 144. The first nylon layer 142 is located between the first and third adhesive layers 108, 144, whereas the second polyester layer 150 is located between the second and the third adhesive layers 140, 144. The second adhesive layer 140 is located between the barrier film 102 and the second polyester layer 150, whereas the third adhesive layer 144 is located between the second polyester layer 150 and the first nylon layer 142. In this embodiment, the second adhesive layer 140 is adjacent to the barrier coating layer 106 and the first polyester layer 104 is the outermost layer of the multi-ply structure 2000.

Figure 21:
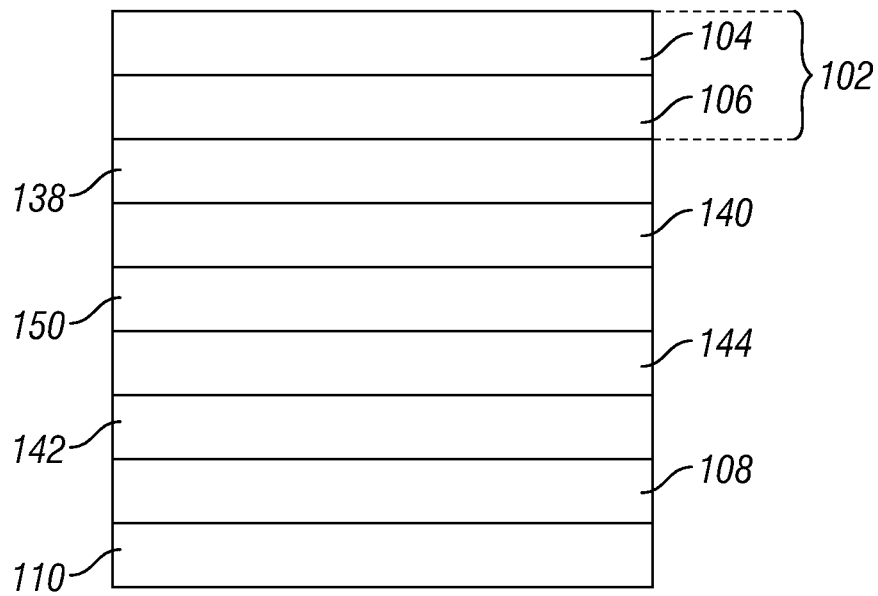
FIG. 21 is a cross-sectional view of a multi-ply structure in accordance with an embodiment of the present disclosure.
Figure 22:
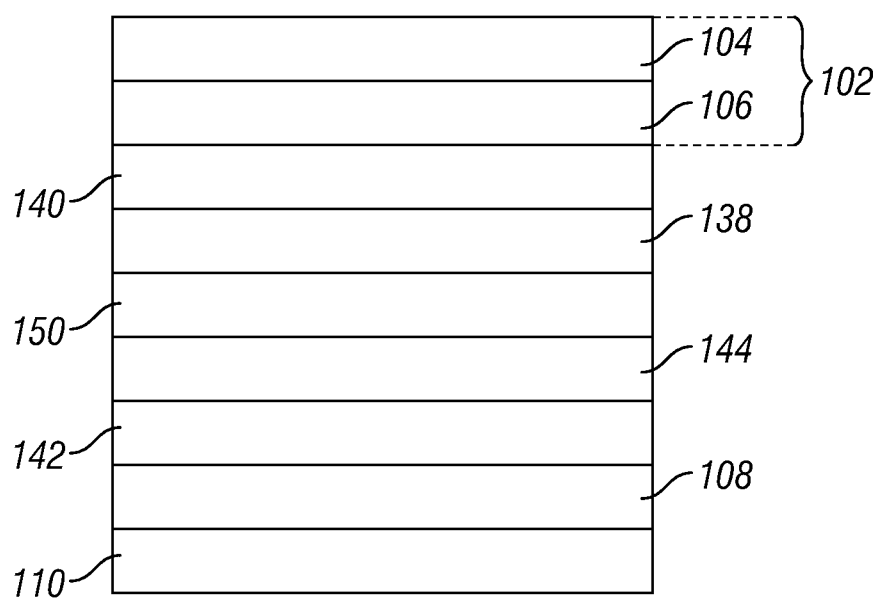
FIG. 22 is a cross-sectional view of a multi-ply structure in accordance with an embodiment of the present disclosure.

FIGS. 21 and 22 illustrate possible variations of the multi-ply structure 2000 shown in FIG. 20. The multi-ply structures 2100 and 2200 both include an ink layer 138. In FIG. 21, the ink layer 138 is located between the barrier film 102 and the second adhesive layer 140. In this embodiment, the ink layer 138 is adjacent to the barrier coating layer 106. In FIG. 22, the ink layer 138 is located between the second adhesive layer 140 and the second polyester layer 150. In both FIGS. 2100 and 2200, the first polyester layer 104 is the outermost layer of the multi-ply structures 2100 and 2200, respectively.

Figure 23:
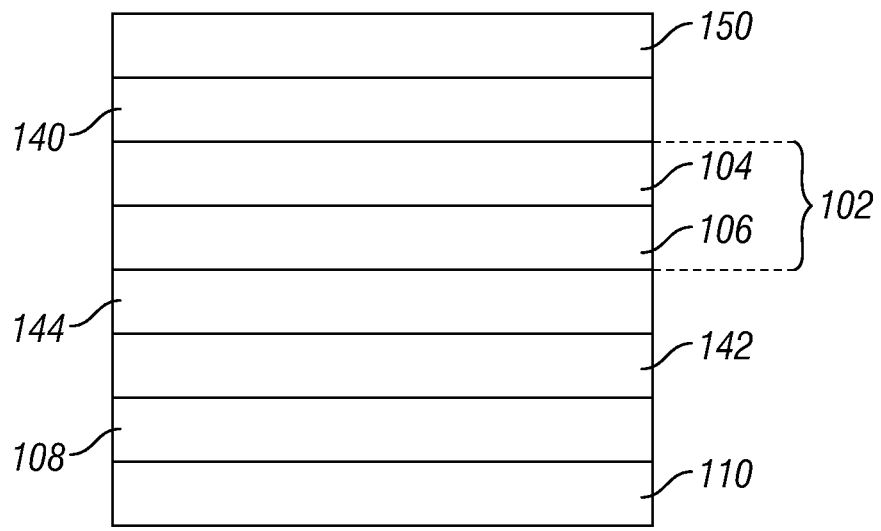
FIG. 23 is a cross-sectional view of a multi-ply structure in accordance with an embodiment of the present disclosure.

Another embodiment of the multi-ply structure is illustrated in FIG. 23. The multi-ply structure 2300 is similar to the multi-ply structure 1600 in FIG. 16, except that the multi-ply structure 2300 further includes a third adhesive layer 144 and a first nylon layer 142. The third adhesive layer 144 is located between the barrier film 102 and the first nylon layer 142, whereas the first nylon layer 142 is located between the first and the third adhesive layers 108, 144. In this embodiment, the third adhesive layer 144 is adjacent to the barrier coating layer 106 and the second polyester layer 150 is the outermost layer of the multi-ply structure 2300.

Figure 24:
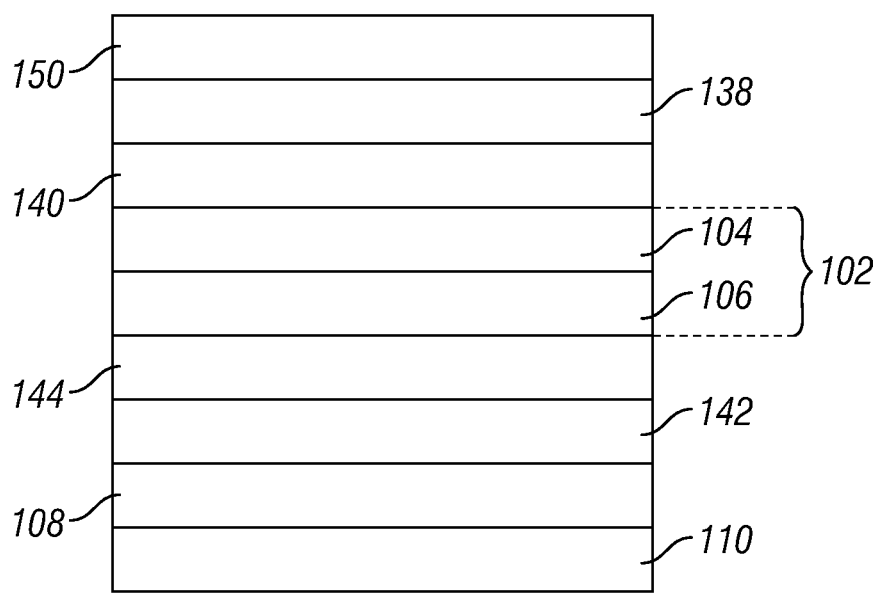
FIG. 24 is a cross-sectional view of a multi-ply structure in accordance with an embodiment of the present disclosure.
Figure 25:
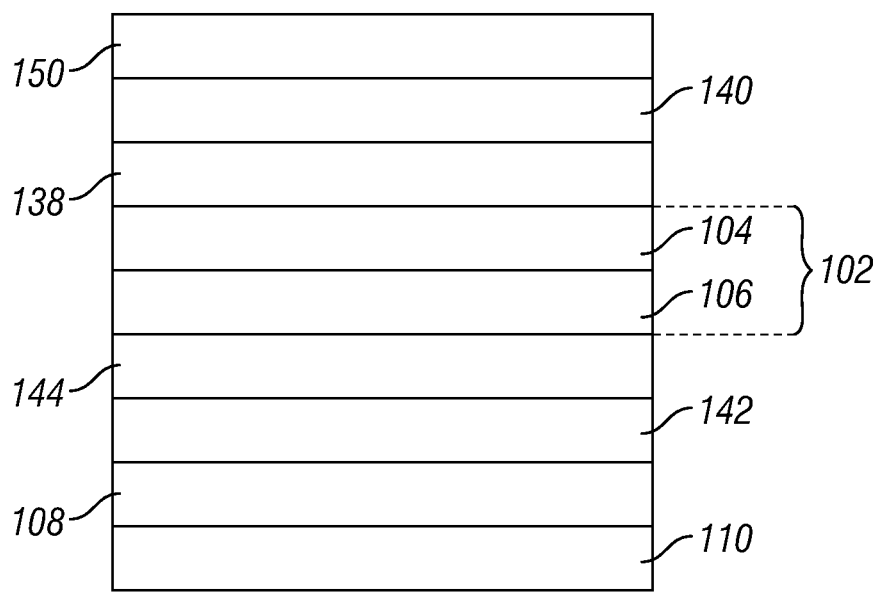
FIG. 25 is a cross-sectional view of a multi-ply structure in accordance with an embodiment of the present disclosure.

FIGS. 24 and 25 illustrate possible variations of the multi-ply structure 2300 shown in FIG. 23. The multi-ply structures 2400 and 200 both include an ink layer 138. In FIG. 24, the ink layer 138 is located between the second polyester layer 150 and the second adhesive layer 140. In FIG. 25, the ink layer 138 is located between the second adhesive layer 140 and the barrier film 102. In this embodiment, the ink layer 138 is adjacent to the first polyester layer 104. In both FIGS. 2400 and 2500, the second polyester layer 150 is the outermost layer of the multi-ply structures 2400 and 2500, respectively.

Figure 26:
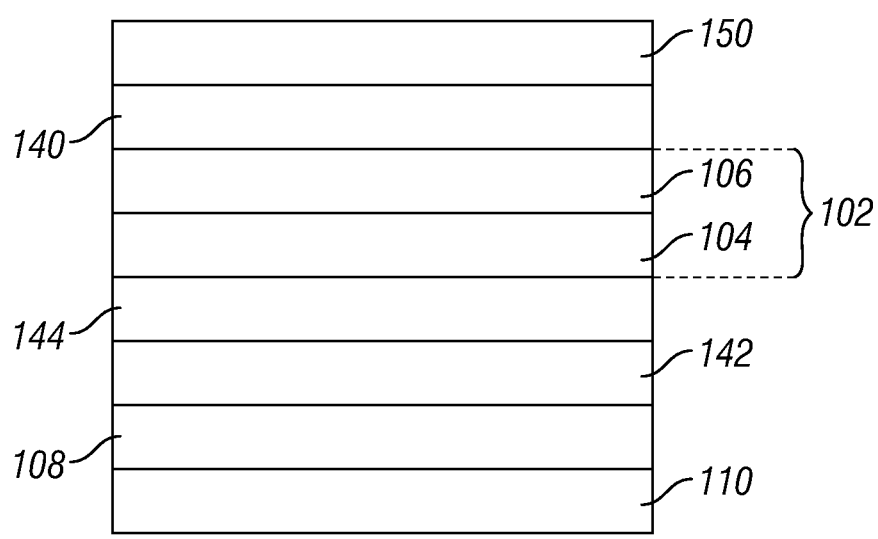
FIG. 26 is a cross-sectional view of a multi-ply structure in accordance with an embodiment of the present disclosure.

Another embodiment of the multi-ply structure is illustrated in FIG. 26. The multi-ply structure 2600 is similar to the multi-ply structure 2300 in FIG. 23, except that the second adhesive layer 140 is adjacent to the barrier coating layer 106, rather than the first polyester layer 104.

Figure 27:
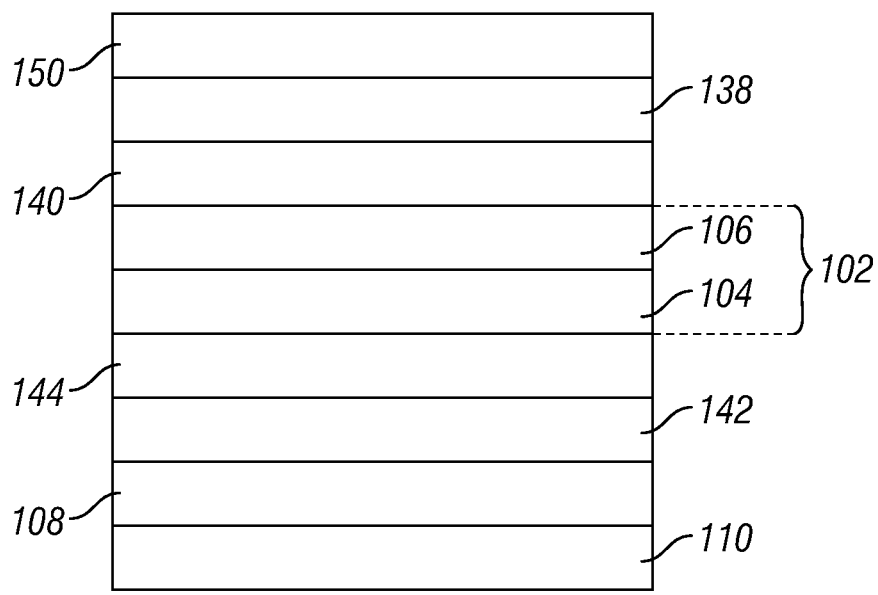
FIG. 27 is a cross-sectional view of a multi-ply structure in accordance with an embodiment of the present disclosure.
Figure 28:
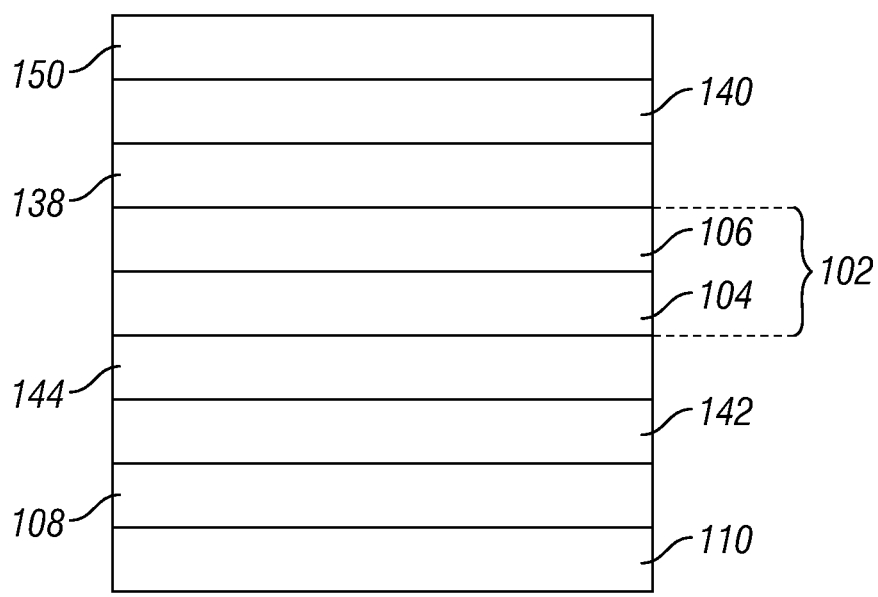
FIG. 28 is a cross-sectional view of a multi-ply structure in accordance with an embodiment of the present disclosure.

FIGS. 27 and 28 illustrate possible variations of the multi-ply structure 2600 shown in FIG. 26. The multi-ply structures 2700 and 2800 both include an ink layer 138. In FIG. 27, the ink layer 138 is located between the second polyester layer 150 and the second adhesive layer 140. In FIG. 28, the ink layer 138 is located between the second adhesive layer 140 and the barrier film 102. In this embodiment, the ink layer 138 is adjacent to the barrier coating layer 106. In both FIGS. 2700 and 2800, the second polyester layer 150 is the outermost layer of the multi-ply structures 2700 and 2800, respectively.

Methods of Manufacture

The multi-ply structures provided herein may be formed by any of the conventional processes for making multi-ply structures, including adhesive lamination, extrusion lamination, blown film or cast film, extrusion coating, and combinations thereof. In certain embodiments, the barrier film and/or the multi-layered sealant film is formed off-line with respect to the forming of the multi-ply structure. That is, the barrier film and/or multi-layered sealant film can be formed in separate and independent preliminary processes with respect to the process used to form the multi-ply structure. In embodiments where the multi-ply structure includes an ink layer, the ink layer is printed onto a formed layer or film during the fabrication of the multi-ply structure. In one embodiment, the barrier film is formed off-line in which the first polyester layer is formed through a cast film process with an in-line tenter frame and then the barrier coating layer is deposited via chemical vapor deposition onto the first polyester layer, and the multi-layered sealant film is formed off-line via blown film or cast film process, after which the barrier film, the multi-layered sealant film, and any other additional layer(s), such as nylon layer(s) and/or additional polyester layer(s) are formed into the multi-ply structure via adhesive lamination.

Packages

The multi-ply structures described herein may be used in a variety of packaging applications, such as in the formation of packages. In embodiments, the present multi-ply structures may be formed in-line or off-line with the forming of a package. In certain embodiments, a roll of film comprising the multi-ply structures described herein may be used to form a package.

In embodiments, during the formation of the package, it is filled with product and sealed.

In certain embodiments, the package includes a multi-ply structure that defines an interior space of the package and a product disposed within the interior space. The multi-ply structure comprises a barrier film, which includes a first polyester layer and a barrier coating layer, a first adhesive layer, and a multi-layered sealant film, as described herein, wherein the adhesive layer is located between the barrier film and the multi-layered sealant film.

In one embodiment, the multi-layered sealant film includes a first nylon layer and a sealing layer, and a second nylon layer, a third nylon layer, four tie layers, and a first polyolefin layer that are each located between the first nylon layer and the sealant layer, which the first polyolefin layer is located between the first and the second nylon layers, and the third nylon layer is located between the second nylon layer and the sealing layer, and which a first of the four tie layers is located between the first nylon layer and the first polyolefin layer, a second of the four tie layers is located between the first polyolefin layer and the second nylon layer, a third of the four tie layers is located between the second and the third nylon layers, and a fourth of the four tie layers is located between the third nylon layer and the sealing layer.

In another embodiment, the multi-layered sealant film includes a first nylon layer and a sealing layer, and a second nylon layer, a third nylon layer, three tie layers, a first polyolefin layer, and a second polyolefin layer that are each located between the first nylon layer and the sealant layer, which the first and the second polyolefin layers are located between the first and the second nylon layers and the second and the third nylon layers are located between the second polyolefin layer and the sealing layer, and which a first of the three tie layers is located between the first nylon layer and the first polyolefin layer, a second of the three tie layers is located between the second polyolefin layer and the second nylon layer, and a third of the three tie layers is located between the third nylon layer and the sealing layer.

Non-limiting examples of suitable products include food products such as soups, ready meals, rice, meats, baby food, wet pet food, pasta, vegetable(s), and the like, drink products such as beverages and the like, and pharmaceutical products.

In some embodiments, the package is in the form of a pouch. Exemplary pouches include stand-up pouches, four-side seal pouches, pillow pouches, c-fold pouches, step-cut, pinch bottom pouches, and chevron pouches. It should be noted that any of these exemplary pouches may include one or more fitments (e.g., one or more spouts).

Figure 29:
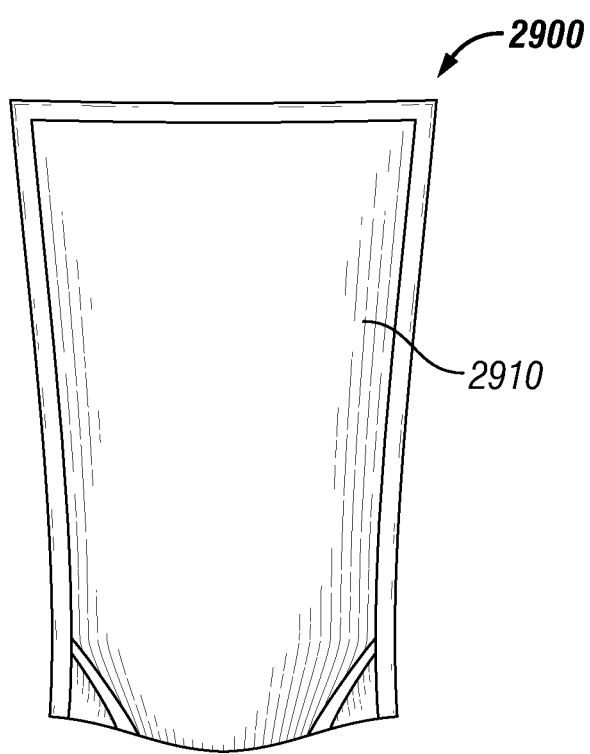
FIG. 29 is a perspective view of a package, which is in the form of an exemplary stand-up pouch, in accordance with an embodiment of the present disclosure.

One embodiment of a package is illustrated in FIG. 29. In FIG. 29, the package 2900 is an exemplary stand-up pouch. The package 2900 is formed from a multi-ply structure 2910, which is the multi-ply structure 1000 of FIG. 10 having the multi-layered sealant film of 110B of FIG. 4. The multi-ply structure 2910 defines an interior space of the package 2900 and product is disposed within such space.

The present packages may be formed from a multi-ply structure described herein, where the multi-ply structure is sealed to itself or to another film to form a pouch by forming heat seals about the periphery of the pouch body. The other film may be the same or different than the multi-ply structure.

In another embodiment, the package includes a container body having a rim in which the container body defines an interior space of the package, product disposed within the interior space, and a multi-ply structure affixed to the rim. The multi-ply structure includes a barrier film comprising a first polyester layer and a barrier coating layer, a first adhesive layer, and a multi-layered sealant film, as described herein, wherein the first adhesive layer is located between the barrier film and the multi-layered sealant film.

In certain embodiments, the container body is rigid or semi-rigid.

In one embodiment, the multi-layered sealant film includes a first nylon layer and a sealing layer, and a second nylon layer, a third nylon layer, four tie layers, and a first polyolefin layer that are each located between the first nylon layer and the sealant layer, which the first polyolefin layer is located between the first and the second nylon layers, and the third nylon layer is located between the second nylon layer and the sealing layer, and which a first of the four tie layers is located between the first nylon layer and the first polyolefin layer, a second of the four tie layers is located between the first polyolefin layer and the second nylon layer, a third of the four tie layers is located between the second and the third nylon layers, and a fourth of the four tie layers is located between the third nylon layer and the sealing layer.

In another embodiment, the multi-layered sealant film includes a first nylon layer and a sealing layer, and a second nylon layer, a third nylon layer, three tie layers, a first polyolefin layer, and a second polyolefin layer that are each located between the first nylon layer and the sealant layer, which the first and the second polyolefin layers are located between the first and the second nylon layers and the second and the third nylon layers are located between the second polyolefin layer and the sealing layer, and which a first of the three tie layers is located between the first nylon layer and the first polyolefin layer, a second of the three tie layers is located between the second polyolefin layer and the second nylon layer, and a third of the three tie layers is located between the third nylon layer and the sealing layer.

In some embodiments, the container body is a rigid or semi-rigid tray or cup. In another embodiment, the container body is a flexible formed web.

Figure 4:
FIG. 4 is a cross-sectional view of a multi-layered sealant film in accordance with an embodiment of the present disclosure.
Figure 30:
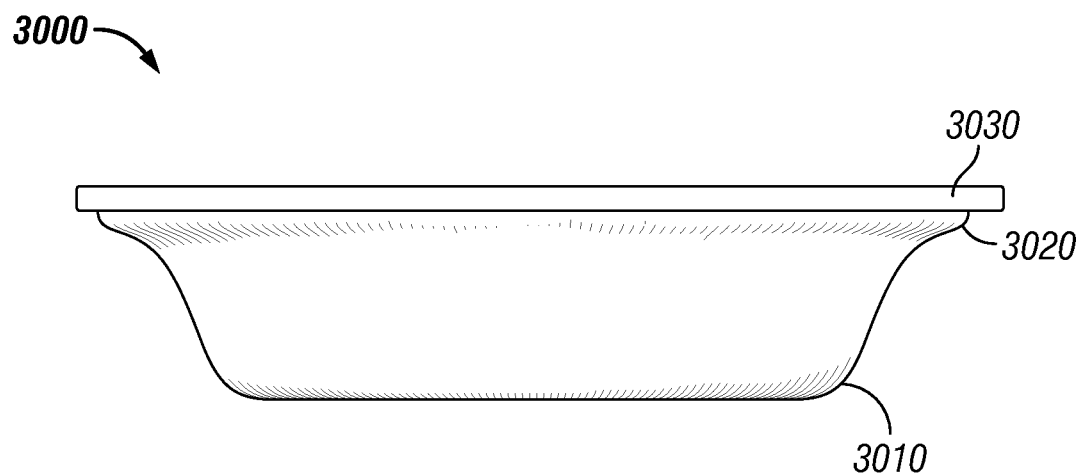
FIG. 30 is a side elevation view of a package including a lidding formed from a multi-ply structure in accordance with an embodiment of the present disclosure.

FIG. 30 shows an exemplary package 3000 that includes a rigid or semi-rigid container body 3010 having a rim (or flange) 3020, and a multi-ply structure 3030, which is the multi-ply structure 1000 of FIG. 10 having the multi-layered sealant film of 110B of FIG. 4. The multi-ply structure 3030 is attached to the rim 3020. For example, the multi-ply structure 3030 may be heat sealed about the rim 3020 of the container body 3010.

The container body may be made of any suitable material, such as injection molded or thermoformed polypropylene, polyethylene, and the like; however, the composition of the container base and multi-layered sealant film of the multi-ply structure should be compatible with one another so that the heat sealing creates a sealing interface between the container body and the multi-ply structure. In some embodiments, it may be desirable that the multi-ply structure includes a pull tab that extends beyond the rim of the container body to allow a user to more readily grasp and peel the multi-ply structure to open the package.

In certain embodiments, the package includes one or more fitments. In other embodiments, the package includes at least one pull tab. In one embodiment, the package includes one or more fitments and at least one pull tab.

In some embodiments, the package does not comprise a microwave energy interactive material, such as those described in International Publication No. WO 2012/148895 (e.g., foil patch, patterned foil, a susceptor, or combinations thereof).

In certain embodiments, once the package is formed, filled with product, and sealed, the sealed package is then microwaved in a pressurized vessel to form a microwaved package. In some embodiments, the pressurized vessel includes a fluid medium. In one embodiment, the fluid medium is a liquid and the package and the product disposed into the package is at least partially immersed in the liquid. In another embodiment, the fluid medium is steam.

As used herein, a "conventional microwaved package" is a package that includes a conventional microwaved multi-ply structure as defined herein. That is, a conventional microwaved package does not include a structure that includes a combination of at least a barrier film, a first adhesive layer, and a multi-layered sealant film in which the multi-layered sealant film comprises at least one or more nylon layers and at least one or more polyolefin layers.

As used herein, a "conventional multi-ply structure" of a conventional microwaved package is a conventional microwaved multi-ply structure as defined herein.

In embodiments, the microwaved packages are sterilized during the MATS process. In embodiments where the microwaved packages contain a product disposed within the package, the product is also sterilized. Additionally when the package contains a food or a drink product, the product is also pasteurized during the MATS process.

Methods of Sterilization

The present multi-ply structures and the packages made therefrom are suitable for use in sterilization processes. In particular, the multi-ply structures and packages of the present disclosure are sterilized via microwaved assisted thermal sterilization (MATS), such as those described herein and in U.S. Pat. Nos. 5,436,432, 5,750,966, 7,119,313, 7,230,217, 9,066,376, 9,179,505, and 9,271,338, and in International Publication Nos. WO 2016/044571, WO 2016/100539, and WO 2015/171763, all of which are incorporated herein by reference.

In some embodiments, the method for sterilization includes feeding a package, which the package has product disposed within an interior space thereof, into a pressurized vessel, and exposing the package and the product within the pressurized vessel to microwave energy, where the package and the product are exposed to one or more cycles of microwave energy. The package includes a multi-ply structure as described herein. For example, in one embodiment, the multi-ply structure is the multi-ply structure illustrated 1000 in FIG. 10, whereas in other embodiments, the multi-ply structure is the multi-ply structure 2100 as illustrated in FIG. 21.

As used herein, "one or more cycles" means one or more separate intervals.

In some embodiments, the pressurized vessel includes a fluid medium. In one embodiment, the pressurized vessel includes a liquid and the multi-ply structure or the package is at least partially immersed in the liquid.

In some embodiments, during each cycle, the package and the product are exposed to about 5 kW to about 40 kW of microwave energy. In one embodiment, during each cycle, the package and the product are exposed to 10 kW to about 30 kW of microwave energy.

In embodiments, the product is also pasteurized during the sterilization process.

Figure 31:
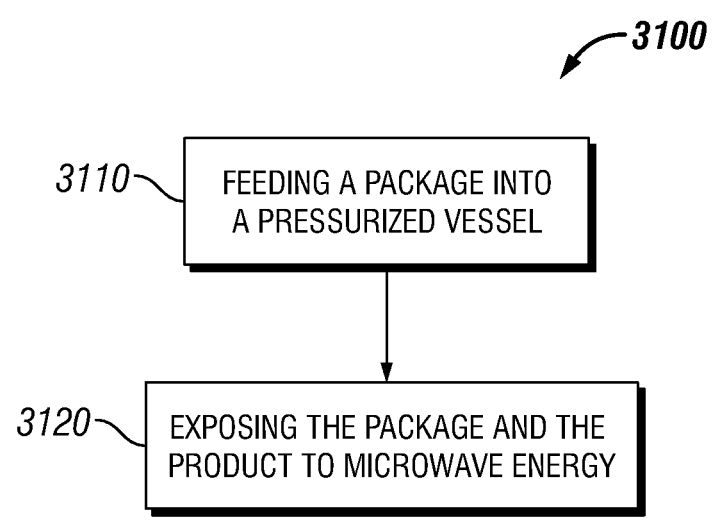
FIG. 31 is a process flow diagram that illustrates a method for sterilization in accordance with an embodiment of the present disclosure.
Figure 32:
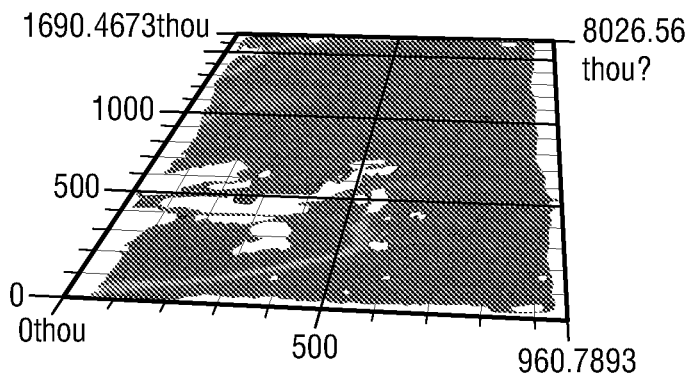
FIG. 32 is a 3D topographical image of the multi-ply structure sample 1 in the examples.
Figure 33:
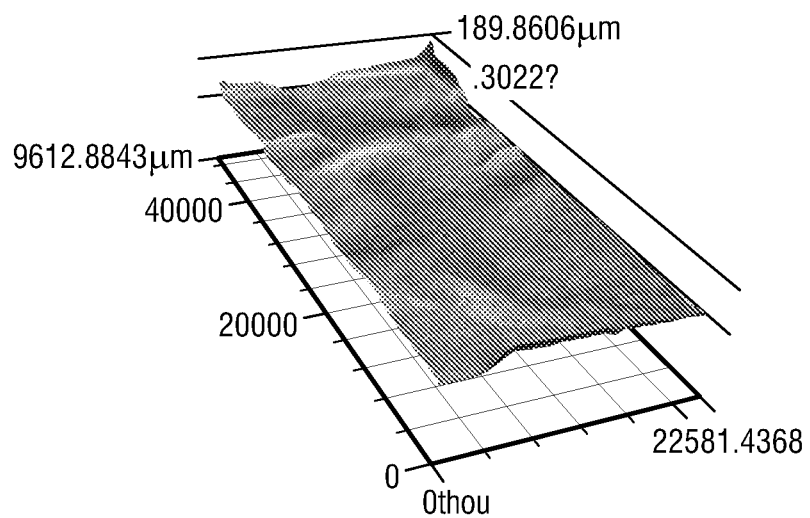
FIG. 33 is a 3D topographical image of the multi-ply structure sample 2 in the examples.
Figure 34:
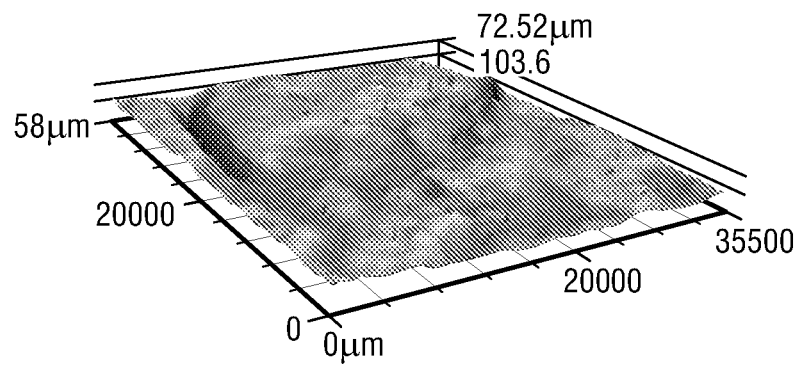
FIG. 34 is a 3D topographical image of the multi-ply structure sample 3 in the examples.
Figure 35:
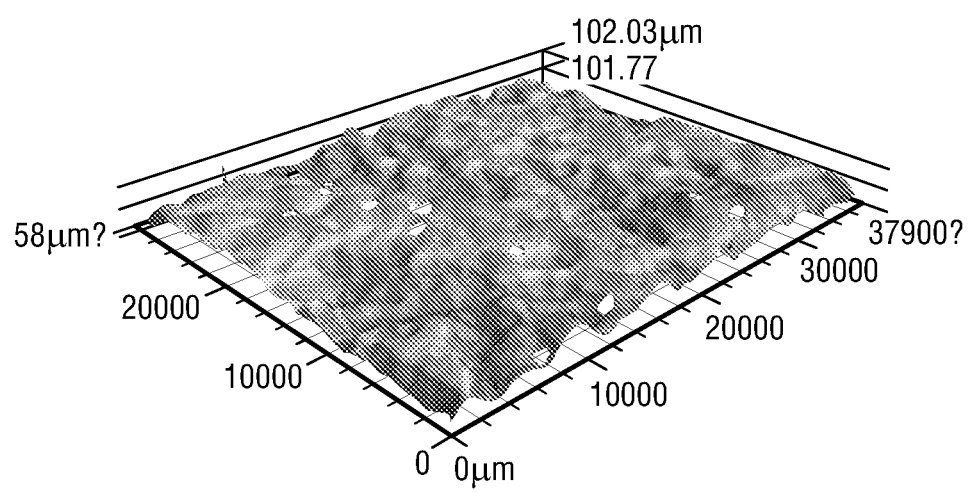
FIG. 35 is a 3D topographical image of the multi-ply structure control sample in the examples.

One exemplary method of sterilization is illustrated in FIG. 31. The method 3100 includes the method for sterilization includes feeding a package having product disposed therein into a pressurized vessel 3110 and exposing the package and the product to microwave energy 3120.

The present teachings may be further understood with reference to the following non-limiting examples.

EXAMPLES

Protocol for Determination of Surface Roughness (ISO 25178 Method)

A coating made of silicone rubber compound (Struers Repliset) is applied to approximately 1.5 in.×1.5 in. area of a multi-ply structure sample. The imprint of the surface texture on this coating is then scanned by a Keyence VR3000 microscope using white light. A 3D topographical image of the scanned surface is obtained on a computer screen. The effects of warpage and tilt caused by sample preparation are removed by applying certain filters to the image resulting in only pure topographical image of the surface. A reference surface (mean plane) is selected for each image. Computer software then calculates the deviation of height distribution from the reference surface which is set at height of zero. The arithmetic mean height ($S_a$) is then calculated for each sample as a measure of surface roughness (μm).

When comparing two separate multi-ply structure samples, the sample with the higher value for average surface roughness, $S_a$, has a rougher surface as compared to the other sample.

Example 1

Various packages were prepared which included a container body, cheese tortellini which served as the product, and a multi-ply structure sealed to the container body. For each package, the container body was in the form of a square tray and filled with cheese tortellini and the multi-ply structure was heat sealed to the container body to form a sealed package. Additionally, for each package, temperature probes were inserted into the container body prior to filling and sealing.

Four sample packages—Package Sample 1, Package Sample 2, Package Sample 3, and Control Package Sample—were prepared in which each package sample included an exemplary multi-ply structure.

Each multi-ply structure—Multi-Ply Structure Sample 1, Multi-Ply Structure Sample 2, Multi-Ply Structure Sample 3, and Multi-Ply Structure Control Sample—included a barrier film, a multi-layered sealant film, a nylon layer, and two adhesive layers, as illustrated in FIG. 10. The below table illustrates the compositional make-up and layer sequencing of the multi-ply structure samples in which the barrier film is the outermost layer and the sealant film in the innermost layer.

TABLE 1

Multi-Ply Structure Samples

| Film/Layer | Material |
| --- | --- |
| Barrier Film ($AlO_x$ PET) | 48 gauge $AlO_x$ polyethylene terephthalate (PET) |
| Adhesive Layer | Solvent-based polyurethane adhesive |
| Nylon Layer | 60 gauge biaxially oriented nylon (BON) |
| Adhesive Layer | Solvent-based polyurethane adhesive |
| Multi-Layered Sealant Film | A sealant film as described in Table 3, 4, 5, or 6 |

Each sealant film, except the sealant film for the Multi-Ply Structure Control Sample, included two polyolefin layers, two nylon layers, two tie layers, and a sealing layer, as illustrated in FIG. 4. The sealant film of the Multi-Ply Structure Control Sample included two polyolefin layers and a sealing layer. In these sealant films, the sealing layer is an easy peel layer.

The materials that may be used to form exemplary multi-layered sealant films are listed in Table 2.

TABLE 2

Material Identification for Exemplary Multi-layered Sealant Films

| RESIN TYPE | RESIN PROPERTIES |
| --- | --- |
| Random Co-polymer Polypropylene (RCPP 1) | 0.9 g/cc density, 6.5 g/10 min. melt index |
| Random Co-polymer Polypropylene (RCPP 2) | 0.9 g/cc density, 8.0 g/10 min. melt index |
| Thermoplastic Olefin (TPO) | 0.892 g/cc density, 0.65 g/10 min. melt index |
| High Crystalline Polypropylene (HCPP) | 0.9 g/cc density, 2.5 g/10 min. melt index |
| Tie | 0.9 g/cc density, 4.0 g/10 min. melt index |
| Nylon | 1.13 g/cc density |
| Slip Master Batch | 0.922 g/cc density, 2.2 g/10 min. melt index |
| Anti-Block Master Batch | 0.96 g/cc density, 7 g/10 min. melt index |
| White Master Batch | 1.51 g/cc density, 8.9 g/10 min. melt index |
| Blend 1 | RCPP1 0.9 g/cc density and 6.5 g/10 min. melt index, LDPE 0.924 g/cc density and 4.15 g/10 min. melt index with added slip and antiblock |
| Blend 2 | RCPP2 0.9 g/cc density and 8.0 g/10 min. melt index, LDPE 0.924 g/cc density and 4.15 g/10 min. melt index with added slip and antiblock |

Each of the below tables, i.e., tables 3-6, illustrates the compositional make-up and layer sequencing of the sealant film for each multi-ply structure sample in which layer A is the outermost layer of the sealant film.

TABLE 3

Sealant Film of Multi-Ply Structure Sample 1
(Film Gauge 2.75 mil)

| Layer | Resin Type | Weight Percent* (%) | Total Weight Percent** (%) |
|---|---|---|---|
| First Polyolefin Layer | RCPP 2 | 97 | 20 |
|  | Slip Master Batch | 3 |  |
| First Tie Layer | Tie | 100 | 11 |
| First Nylon Layer | Nylon | 100 | 10 |
| Second Nylon Layer | Nylon | 100 | 10 |
| Second Tie Layer | Tie | 100 | 6 |
| Second Polyolefin Layer | TPO | 97 | 25 |
|  | Slip Master Batch | 3 |  |
| Easy Peel Layer | Blend 2 | 60 | 18 |
|  | RCPP 2 | 40 |  |

*Weight Percent: Based on weight of individual layer.
**Total Weight Percent: Based on weight of the sealant film.

TABLE 4

Sealant Film of Multi-Ply Structure Sample 2
(Film Gauge 3.25 mil)

| Layer | Resin Type | Weight Percent* (%) | Total Weight Percent** (%) |
|---|---|---|---|
| First Polyolefin Layer | TPO | 97 | 20 |
|  | Slip Master Batch | 3 |  |
| First Tie Layer | Tie | 100 | 11 |
| First Nylon Layer | Nylon | 100 | 10 |
| Second Nylon Layer | Nylon | 100 | 10 |
| Second Tie Layer | Tie | 100 | 6 |
| Second Polyolefin Layer | TPO | 100 | 25 |
| Easy Peel Layer | Blend 1 | 60 | 18 |
|  | RCPP 1 | 40 |  |

*Weight Percent: Based on weight of individual layer.
**Total Weight Percent: Based on weight of sealant film.

TABLE 5

Sealant Film of Multi-Ply Structure Sample 3
(Film Gauge 3.25 mil)

| Layer | Resin Type | Weight Percent* (%) | Total Weight Percent** (%) |
|---|---|---|---|
| First Polyolefin Layer | HCPP | 97 | 20 |
|  | Slip Master Batch | 3 |  |
| First Tie Layer | Tie | 100 | 11 |
| First Nylon Layer | Nylon | 100 | 10 |
| Second Nylon Layer | Nylon | 100 | 10 |
| Second Tie Layer | Tie | 100 | 6 |
| Second Polyolefin Layer | HCPP | 100 | 25 |
| Easy Peel Layer | Blend 1 | 60 | 18 |
|  | RCPP 1 | 40 |  |

*Weight Percent: Based on weight of individual layer.
**Total Weight Percent: Based on weight of the sealant film

TABLE 6

Sealant Film of Multi-Ply Structure Control Sample
(Film Gauge 2.75 mil)

| Layer | Resin Type | Weight Percent* (%) | Total Weight Percent** (%) |
|---|---|---|---|
| First Polyolefin Layer | RCPP 1 | 96.5 | 15 |
|  | Anti-Block Master Batch | 3.5 |  |
| Second Polyolefin Layer | RCPP 1 | 90 | 65 |
|  | White Master Batch | 10 |  |
| Easy Peel Layer | Blend 1 | 50 | 20 |
|  | RCPP 1 | 50 |  |

*Weight Percent: Based on weight of individual layer.
**Total Weight Percent: Based on weight of the sealant film.

The four sample packages—Packages Sample 1, 2, and 3, and Control Sample—were prepared according to the below manufacturing parameters, and then underwent a MATS process having the below process conditions:

| MANUFACTURING PARAMETERS | | | | |
|---|---|---|---|---|
| FILL VOLUME | SEAL TEMP | SEAL PRESSURE | VACUUM | DWELL TIME |
| 240 g | 220° C. | 6 bar | 130 mbar | 3 seconds |

| MATS PROCESSING CONDITIONS | | |
|---|---|---|
| PRE-HEAT | HEATING/MW | COOLING |
| 65° C.\|50 psi\|35 min | 121° C.\|50 psi\|6 passes @ 10 kW\|carrier speed 2.5 in/sec\|8 sec dwell between passes\| After the 6 passes @ 10 kW, temperature increased to 125° C. and 10 min hold at 125° C. | 35° C.\|50 psi\|9 min |

The temperature probes within the sealed packages were used to measure the temperature at the predetermined hot spots of the sealed packages during the MATS process. The temperature measurement at the predetermined hot spot for each sample package is summarized in the below table:

Hot Spot Temperature Measurements

| Peak Temperature (° C.) | | | | | | |
|---|---|---|---|---|---|---|
| 128.2 | 125.6 | 125.7 | 126.2 | 144.6 | 126.9 | 128.3 |
| Package Sample and Multi-Layered Sample 3 | 1 | 2 | Control | 1 | 3 | 2 |

After undergoing MATS, the surface roughness of each multi-ply structure sample was measured, and the results are summarized in the below table. Additionally, the 3D topographical image of the scanned multi-ply structure samples—Multi-Ply Structure Sample 1, Multi-Ply Structure Sample 2, Multi-Ply Structure Sample 3, and Multi-Ply Structure Control Sample—are illustrated in FIGS. 32-35:

| Multi-Ply Structure Sample | Average Surface Roughness $S_a$ (μm) |
|---|---|
| 1 | 1.54 |
| 2 | 5.98 |
| 3 | 18.68 |
| Control | 28.42 |

As can be seen from the above table, the exemplary multi-ply structures of the present disclosure, which include one or more nylon layers and one or more polyolefin layers, have a lower surface roughness than the control sample, which does not include any nylon layers. Furthermore, the exemplary multi-ply structures have sealant films that include one or more nylon layers and at least one polyolefin that has a higher melting temperature than the polyolefins (RCPP) of the control sample.

Additionally, the hot spot temperature measurements indicate that the exemplary multi-ply structures of the present disclosure—Samples 1, 2, and 3—were exposed to higher peak temperature (by about 2° C. to about 20° C.), and yet still maintained greater heat stability, and therefore have lower surface roughness compared to the control sample.

EMBODIMENTS

Clause 1. A multi-ply structure comprising:
a barrier film comprising a first polyester layer and a barrier coating layer;
a multi-layered sealant film comprising a first nylon layer and a sealing layer, and a second nylon layer, a third nylon layer, four tie layers, and a first polyolefin layer that are each located between the first nylon layer and the sealant layer; and
a first adhesive layer that is located between the barrier film and the multi-layered sealant film,
wherein the first polyolefin layer is located between the first and the second nylon layers, and the third nylon layer is located between the second nylon layer and the sealing layer,
wherein a first of the four tie layers is located between the first nylon layer and the first polyolefin layer, a second of the four tie layers is located between the first polyolefin layer and the second nylon layer, a third of the four tie layers is located between the second and the third nylon layers, and a fourth of the four tie layers is located between the third nylon layer and the sealing layer.

Clause 2. The multi-ply structure of clause 1, wherein the multi-layered sealant film further comprises a second polyolefin layer and a fifth tie layer, wherein the second polyolefin layer is located between the third and fifth tie layers, and the fifth tie layer is located between the second polyolefin layer and the third nylon layer.

Clause 3. The multi-ply structure of clause 1 or 2, wherein the first nylon layer is adjacent to the first adhesive layer.

Clause 4. The multi-ply structure of clause 2 wherein the multi-layered sealant film further comprises a third polyolefin layer and a sixth tie layer, wherein the sixth tie layer is located between the third polyolefin layer and the first nylon layer, and wherein the third polyolefin layer is adjacent to the first adhesive layer.

Clause 5. A multi-ply structure comprising:
a barrier film comprising a first polyester layer and a barrier coating layer;
a multi-layered sealant film comprising a first nylon layer and a sealing layer, and a second nylon layer, a third nylon layer, three tie layers, a first polyolefin layer, and a second polyolefin layer that are each located between the first nylon layer and the sealant layer; and
a first adhesive layer that is located between the barrier film and the multi-layered sealant film,
wherein the first and the second polyolefin layers are located between the first and the second nylon layers,
wherein the second and the third nylon layers are located between the second polyolefin layer and the sealing layer, and
wherein a first of the three tie layers is located between the first nylon layer and the first polyolefin layer, a second of the three tie layers is located between the second polyolefin layer and the second nylon layer, and a third of the three tie layers is located between the third nylon layer and the sealing layer.

Clause 6. The multi-ply structure of any one of clauses 1 to 6, wherein the first polyolefin layer, the second polyolefin layer, or both comprise one or more random copolymer polypropylenes, one or more homopolymer polypropylenes, one or more thermoplastic olefins, one or more high crystalline polypropylenes, or any combination thereof.

Clause 7. The multi-ply structure of any one of clauses 1 to 6, wherein the sealant layer comprises an easy-peel layer.

Clause 8. The multi-ply structure of any one of clauses 1 to 6, wherein the sealant layer comprises one or more random copolymer polypropylenes, one or more homopolymer polypropylenes, one or more terpolymers, or a combination thereof.

Clause 9. The multi-ply structure of any one of clauses 1 to 8, wherein the barrier coating layer comprises aluminum oxide or silicon oxide.

Clause 10. The multi-ply structure of any one of clauses 1 to 9, wherein the multi-ply structure is flexible.

Clause 11. The multi-ply structure of any one of clauses 1 to 10, wherein the multi-ply structure is substantially polymeric.

Clause 12. The multi-ply structure of any one of clauses 1 to 11, wherein the multi-ply structure has been microwaved in a pressured vessel, and the microwaved multi-ply structure has a surface roughness from about 0 μm to about 25 μm.

Clause 13. The multi-ply structure of any one of clauses 1 to 11, wherein the multi-ply structure has been microwaved in a pressured vessel, and the microwaved multi-ply structure has a surface roughness from about 1 µm to about 20 µm.

Clause 14. The multi-ply structure of any one of clauses 1 to 11, wherein the multi-ply structure has been microwaved in a pressurized vessel, and the microwaved multi-ply structure has a surface roughness that is about 10% to about 99% lower than a comparative surface roughness of a conventional microwaved multi-ply structure.

Clause 15. The multi-ply structure of any one of clauses 1 to 11, wherein the multi-ply structure has been microwaved in a pressurized vessel, and the microwaved multi-ply structure has a surface roughness that is about 20% to about 80% lower than a comparative surface roughness of a conventional microwaved multi-ply structure.

Clause 16. The multi-ply structure of any one of clauses 12-15, wherein the pressurized vessel comprises a liquid and the multi-ply structure is at least partially immersed in the liquid.

Clause 17. The multi-ply structure of any one of clauses 12 to 15, wherein the microwaved multi-ply structure is sterilized.

Clause 18. The multi-ply structure of any one of clauses 1 to 17, wherein the multi-ply structure does not comprise a microwave energy interactive material.

Clause 19. The multi-ply structure of any one of clauses 1 to 18, further comprising an ink layer located between the barrier film and the first adhesive layer.

Clause 20. The multi-ply structure of any one of clauses 1 to 18, further comprising a second adhesive and a first nylon layer, wherein the second adhesive layer is located between the barrier film and the first nylon layer, and the first nylon layer is located between the first and the second adhesive layers.

Clause 21. The multi-ply structure of clause 20, further comprising a third adhesive layer and a second polyester layer, wherein the third adhesive layer is located between the first nylon layer and the second polyester layer, and the second polyester layer is located between the second and the third adhesive layers.

Clause 22. The multi-ply structure of clause 20 or 21, further comprising an ink layer that is located between (i) the barrier film and the second adhesive layer, (ii) the first nylon layer and the second adhesive layer, or (iii) the second adhesive layer and the second polyester layer.

Clause 23. The multi-ply structure of clause 20, further comprising a third adhesive layer and a second nylon layer, wherein the third adhesive layer is located between the barrier film and the second nylon layer, and the second nylon layer is located between the second and the third adhesive layers.

Clause 24. The multi-ply structure of clause 23, further comprising an ink layer that is located between either (i) the barrier film and the third adhesive layer or (ii) the third adhesive layer and the second nylon layer.

Clause 25. The multi-ply film structure of any one of clauses 1 to 18, further comprising a second polyester layer and a second adhesive layer, wherein the second adhesive layer is located between the second polyester layer and the barrier film, and the barrier film is located between the first and the second adhesive layers.

Clause 26. The multi-ply film structure of clause 25, further comprising an ink layer that is located between the second polyester layer and the second adhesive layer.

Clause 27. The multi-ply structure of clause 25, further comprising a third adhesive layer and a nylon layer, wherein the nylon layer is located between the first and the third adhesive layers, and the third adhesive layer is located between the barrier film and the nylon layer.

Clause 28. The multi-ply structure of clause 27, further comprising an ink layer that is located between either (i) the second polyester layer and the second adhesive layer or (ii) the second adhesive layer and the barrier film.

Clause 29. A package comprising:
the multi-ply structure of any one of clauses 1 to 11, wherein the multi-ply structure defines an interior space of the package; and
a product disposed within the interior space.

Clause 30. The package of clause 29, wherein the package is in the form of a pouch.

Clause 31. The package of clause 30, further comprising one or more fitments.

Clause 32. A package comprising:
a container body having a rim, the container body defining an interior space of the package;
product disposed within the interior space; and
the multi-ply structure of any one clauses 1 to 11 that is affixed to the rim.

Clause 33. The package of clause 32, further comprising at least one pull tab.

Clause 34. The package of any one of clauses 29 to 33, wherein the package has been microwaved in a pressured vessel, and the multi-ply structure of the microwaved package has a surface roughness from about 0 µm to about 25 µm. {delete extra row}

Clause 35 The package of any one of clauses 29 to 33, wherein the package has been microwaved in a pressured vessel, and the multi-ply structure of the microwaved package has a surface roughness from about 1 µm to about 20 µm.

Clause 36. The package of any one of clauses 29 to 33, wherein the package has been microwaved in a pressurized vessel, and the multi-ply structure of the microwaved package has a surface roughness that is about 10% to about 99% lower than a comparative surface roughness of a conventional multi-ply structure of a conventional microwaved package.

Clause 37 The package of any one of clauses 29 to 33, wherein the package has been microwaved in a pressurized vessel, and the multi-ply structure of the microwaved package has a surface roughness that is about 20% to about 80% lower than a comparative surface roughness of a conventional multi-ply structure of a conventional microwaved package.

Clause 38. The package of any one of clauses 34 to 37, wherein the pressurized vessel comprises a liquid and the microwaved package and product are at least partially immersed in the liquid.

Clause 39. The package of any one of clauses 34 to 37, wherein the microwaved package and product are sterilized.

Clause 40. The package of any one of clauses 34 to 39, wherein the product is a food product or a drink product.

Clause 41. The package of clause 40, wherein the product is pasteurized.

Clause 42. The package of any one of clauses 29 to 41, wherein the multi-ply structure does not comprise a microwave energy interactive material.

Clause 43. The package of any one of clauses 29 to 42, wherein the multi-ply structure further comprises an ink layer located between the barrier film and the first adhesive layer.

Clause 44. The package of any one of clauses 29 to 42, wherein the multi-ply structure further comprises a second adhesive and a first nylon layer, wherein the second adhesive layer is located between the barrier film and the first nylon layer, and the first nylon layer is located between the first and the second adhesive layers.

Clause 45. The package of clause 44, wherein the multi-ply structure further comprises a third adhesive layer and a second polyester layer, wherein the third adhesive layer is located between the first nylon layer and the second polyester layer, and the second polyester layer is located between the second and the third adhesive layers.

Clause 46. The package of clause 44 or 45, wherein the multi-ply structure further comprises an ink layer that is located between (i) the barrier film and the second adhesive layer, (ii) the first nylon layer and the second adhesive layer, or (iii) the second adhesive layer and the second polyester layer.

Clause 47. The package of clause 44, wherein the multi-ply structure further comprises a third adhesive layer and a second nylon layer, wherein the third adhesive layer is located between the barrier film and the second nylon layer, and the second nylon layer is located between the second and the third adhesive layers.

Clause 48. The package of clause 47, wherein the multi-ply structure further comprises an ink layer that is located between either (i) the barrier film and the third adhesive layer, or (ii) the third adhesive layer and the second nylon layer.

Clause 49. The package of any one of clauses 29 to 42, wherein the multi-ply structure further comprises a second polyester layer and a second adhesive layer, wherein the second adhesive layer is located between the second polyester layer and the barrier film, and the barrier film is located between the first and the second adhesive layers.

Clause 50. The package of clause 49, wherein the multi-ply structure further comprises an ink layer that is located between the second polyester layer and the second adhesive layer.

Clause 51. The package of clause 49, wherein the multi-ply structure further comprises a third adhesive layer and a nylon layer, wherein the nylon layer is located between the first and the third adhesive layers, and the third adhesive layer is located between the barrier film and the nylon layer.

Clause 52. The package of clause 51, wherein the multi-ply structure further comprises an ink layer that is located between either (i) the second polyester layer and the second adhesive layer or (ii) the second adhesive layer and the barrier film.

Clause 53. A method for sterilization, the method comprising:
feeding a package into a pressurized vessel, the package having product disposed within an interior space of the package, wherein the package comprises the multi-ply structure of any one of clauses 1 to 11; and
exposing the package and the product within the pressurized vessel to one or more cycles of microwave energy.

Clause 54. The method of clause 53, wherein the pressurized vessel comprises a liquid and the package and the product are at least partially immersed in the liquid when exposed to the microwave energy.

Clause 55. The method of clause 53 or 54, wherein, during each cycle, the package and the product are exposed to about 5 kW to about 40 kW of microwave energy.

Clause 56. The method of any one of clauses 53 to 55, wherein the product is a food product or a drink product, and wherein the product is pasteurized.

Clause 57. The method of any one of clauses 53 to 56, wherein the package does not comprise a microwave energy interactive material.

Clause 58. The method of any one of clauses 53 to 57, wherein the multi-ply structure of the microwaved package has a surface roughness from about 0 μm to about 25μm.

Clause 59 The method of any one of clauses 53 to 57, wherein the multi-ply structure of the microwaved package has a surface roughness from about 1 μm to about 20 μm.

Clause 60. The method of any one of clauses 53 to 57, wherein the multi-ply structure of the microwaved package has a surface roughness that is about 10% to about 99% lower than a comparative surface roughness of a conventional multi-ply structure of a conventional microwaved package.

Clause 61 The method of any one of clauses 53 to 57, wherein the multi-ply structure of the microwaved package has a surface roughness that is about 20% to about 80% lower than a comparative surface roughness of a conventional multi-ply structure of a conventional microwaved package.

Clause 62. The method of any one of clause 53 to 61, wherein the microwaved package is in the form of a pouch that is formed from the multi-ply structure.

Clause 63. The method of clause 62, wherein the package further comprises one or more fitments.

Clause 64. The method of any one of clauses 53 to 61, wherein the package further comprises a container body having a rim and the multi-ply structure is affixed to the rim.

Clause 65. The method of clause 64, wherein the package comprises at least one pull tab.

Clause 66. The method of any one of clauses 53 to 65, wherein the multi-ply structure further comprises an ink layer located between the barrier film and the first adhesive layer.

Clause 67. The method of any one of clauses 53 to 65, wherein the multi-ply structure further comprises a second adhesive and a first nylon layer, wherein the second adhesive layer is located between the barrier film and the first nylon layer, and the first nylon layer is located between the first and the second adhesive layers.

Clause 68. The method of clause 67, wherein the multi-ply structure further comprises a third adhesive layer and a second polyester layer, wherein the third adhesive layer is located between the first nylon layer and the second polyester layer, and the second polyester layer is located between the second and the third adhesive layers.

Clause 69. The method of clause 67 or 68, wherein the multi-ply structure further comprises an ink layer that is located between (i) the barrier film and the second adhesive layer, (ii) the first nylon layer and the second adhesive layer, or (iii) the second adhesive layer and the second polyester layer.

Clause 70. The method of clause 67, wherein the multi-ply structure further comprises a third adhesive layer and a second nylon layer, wherein the third adhesive layer is located between the barrier film and the second nylon layer, and the second nylon layer is located between the second and the third adhesive layers.

Clause 71. The method of clause 70, wherein the multi-ply structure further comprises an ink layer that is located between either (i) the barrier film and the third adhesive layer, or (ii) the third adhesive layer and the second nylon layer.

Clause 72. The method of any one of clauses 53 to 65, wherein the multi-ply structure further comprises a second polyester layer and a second adhesive layer, wherein the second adhesive layer is located between the second polyester layer and the barrier film, and the barrier film is located between the first and the second adhesive layers.

Clause 73. The method of clause 72, wherein the multi-ply structure further comprises an ink layer that is located between the second polyester layer and the second adhesive layer.

Clause 74. The method of clause 72, wherein the multi-ply structure further comprises a third adhesive layer and a nylon layer, wherein the nylon layer is located between the first and the third adhesive layers, and the third adhesive layer is located between the barrier film and the nylon layer.

Clause 75. The method of clause 74, wherein the multi-ply structure further comprises an ink layer that is located between either (i) the second polyester layer and the second adhesive layer or (ii) the second adhesive layer and the barrier film.

Clause 76. A multi-ply structure, as disclosed herein.

Clause 77. A package, as disclosed herein.

Clause 78. A method for sterilization of a package, as disclosed herein.

For the purposes of describing and defining the present teachings, it is noted that unless indicated otherwise, the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

It will be appreciated that various above-disclosed and other features and functions, or alternatives thereof, may be desirably combined into many other different products or applications. Various presently unforeseen or unanticipated alternatives, modifications, variations, or improvements therein may be subsequently made by those skilled in the art which are also intended to be encompassed by the following claims.

We claim:

1. A multi-ply structure comprising:
    a barrier film comprising a first polyester layer and a barrier coating layer;
    a multi-layered sealant film comprising a first nylon layer and a sealing layer, and a second nylon layer, a third nylon layer, four tie layers, and a first polyolefin layer that are each located between the first nylon layer and the sealing layer; and
    a first adhesive layer that is located between the barrier film and the multi-layered sealant film,
    wherein the first polyolefin layer is located between the first and the second nylon layers, and the third nylon layer is located between the second nylon layer and the sealing layer,
    wherein a first of the four tie layers is located between the first nylon layer and the first polyolefin layer, a second of the four tie layers is located between the first polyolefin layer and the second nylon layer, a third of the four tie layers is located between the second and the third nylon layers, and a fourth of the four tie layers is located between the third nylon layer and the sealing layer.

2. The multi-ply structure of claim 1, wherein the multi-layered sealant film further comprises a second polyolefin layer and a fifth tie layer, wherein the second polyolefin layer is located between the third and fifth tie layers, and the fifth tie layer is located between the second polyolefin layer and the third nylon layer.

3. The multi-ply structure of claim 1, wherein the first nylon layer is adjacent to the first adhesive layer.

4. The multi-ply structure of claim 2 wherein the multi-layered sealant film further comprises a third polyolefin layer and a sixth tie layer, wherein the sixth tie layer is located between the third polyolefin layer and the first nylon layer, and wherein the third polyolefin layer is adjacent to the first adhesive layer.

5. The multi-ply structure of claim 1, wherein the first polyolefin layer, the second polyolefin layer, or both comprise one or more random copolymer polypropylenes, one or more homopolymer polypropylenes, one or more thermoplastic olefins, one or more high crystalline polypropylenes, or any combination thereof.

6. The multi-ply structure of claim 1, wherein the sealant layer comprises an easy-peel layer.

7. The multi-ply structure of claim 1, wherein the sealant layer comprises one or more random copolymer polypropylenes, one or more homopolymer polypropylenes, one or more terpolymers, or a combination thereof.

8. The multi-ply structure of claim 1, wherein the barrier coating layer comprises aluminum oxide or silicon oxide.

9. The multi-ply structure of claim 1, wherein the multi-ply structure is flexible.

10. The multi-ply structure of claim 1, wherein the multi-ply structure has been microwaved in a pressured vessel, and the microwaved multi-ply structure has a surface roughness from about 0 µm to about 25 µm.

11. The multi-ply structure of claim 10, wherein the pressurized vessel comprises a liquid and the multi-ply structure is at least partially immersed in the liquid.

12. The multi-ply structure of claim 1, wherein the multi-ply structure has been microwaved in a pressurized vessel, and the microwaved multi-ply structure has a surface roughness that is about 10% to about 99% lower than a comparative surface roughness of a conventional microwaved multi-ply structure.

13. The multi-ply structure of claim 1, wherein the multi-ply structure does not comprise a microwave energy interactive material.

14. The multi-ply structure of claim 1, further comprising an ink layer located between the barrier film and the first adhesive layer.

15. The multi-ply structure of claim 1, further comprising a second adhesive and a first nylon layer, wherein the second adhesive layer is located between the barrier film and the first nylon layer, and the first nylon layer is located between the first and the second adhesive layers.

16. The multi-ply structure of claim 15, further comprising a third adhesive layer and a second polyester layer, wherein the third adhesive layer is located between the first nylon layer and the second polyester layer, and the second polyester layer is located between the second and the third adhesive layers.

17. The multi-ply structure of claim 15, further comprising an ink layer that is located between (i) the barrier film and the second adhesive layer, (ii) the first nylon layer and the second adhesive layer, or (iii) the second adhesive layer and the second polyester layer.

18. The multi-ply structure of claim 15, further comprising a third adhesive layer and a second nylon layer, wherein the third adhesive layer is located between the barrier film and the second nylon layer, and the second nylon layer is located between the second and the third adhesive layers.

19. The multi-ply film structure of claim 1, further comprising a second polyester layer and a second adhesive layer, wherein the second adhesive layer is located between the second polyester layer and the barrier film, and the barrier film is located between the first and the second adhesive layers.

20. The multi-ply film structure of claim 19, further comprising an ink layer that is located between the second polyester layer and the second adhesive layer.

21. The multi-ply structure of claim 19, further comprising a third adhesive layer and a nylon layer, wherein the nylon layer is located between the first and the third adhesive layers, and the third adhesive layer is located between the barrier film and the nylon layer.

22. A package comprising:
the multi-ply structure of claim 1, wherein the multi-ply structure defines an interior space of the package; and
a product disposed within the interior space.

23. The package of claim 22, wherein the package is in the form of a pouch.

24. A package comprising:
a container body having a rim, the container body defining an interior space of the package;
product disposed within the interior space; and
the multi-ply structure of claim 1 that is affixed to the rim.

25. The package of claim 24, wherein the package has been microwaved in a pressured vessel, and the multi-ply structure of the microwaved package has a surface roughness from about 0 μm to about 25 μm.

26. The package of claims 25, wherein the pressurized vessel comprises a liquid and the microwaved package and product are at least partially immersed in the liquid.

27. The package of claim 24, wherein the package has been microwaved in a pressurized vessel, and the multi-ply structure of the microwaved package has a surface roughness that is about 10% to about 99% lower than a comparative surface roughness of a conventional multi-ply structure of a conventional microwaved package.

28. The package of claim 24, wherein the multi-ply structure does not comprise a microwave energy interactive material.

29. The package of claim 24, wherein the multi-ply structure further comprises an ink layer located between the barrier film and the first adhesive layer.

30. The package of claim 24, wherein the multi-ply structure further comprises a second adhesive and a first nylon layer, wherein the second adhesive layer is located between the barrier film and the first nylon layer, and the first nylon layer is located between the first and the second adhesive layers.

31. The package of claim 30, wherein the multi-ply structure further comprises a third adhesive layer and a second polyester layer, wherein the third adhesive layer is located between the first nylon layer and the second polyester layer, and the second polyester layer is located between the second and the third adhesive layers.

32. The package of claim 30, wherein the multi-ply structure further comprises a third adhesive layer and a second nylon layer, wherein the third adhesive layer is located between the barrier film and the second nylon layer, and the second nylon layer is located between the second and the third adhesive layers.

33. The package of claim 24, wherein the multi-ply structure further comprises a second polyester layer and a second adhesive layer, wherein the second adhesive layer is located between the second polyester layer and the barrier film, and the barrier film is located between the first and the second adhesive layers.

34. The package of claim 33, wherein the multi-ply structure further comprises an ink layer that is located between the second polyester layer and the second adhesive layer.

35. The package of claim 33, wherein the multi-ply structure further comprises a third adhesive layer and a nylon layer, wherein the nylon layer is located between the first and the third adhesive layers, and the third adhesive layer is located between the barrier film and the nylon layer.

36. A method for sterilization, the method comprising:
feeding a package into a pressurized vessel, the package having product disposed within an interior space of the package, wherein the package comprises the multi-ply structure of claim 1; and
exposing the package and the product within the pressurized vessel to one or more cycles of microwave energy.

37. The method of claim 36, wherein the pressurized vessel comprises a liquid and the package and the product are at least partially immersed in the liquid when exposed to the microwave energy.

38. The method of claim 36, wherein, during each cycle, the package and the product are exposed to about 5 kW to about 40 kW of microwave energy.

39. The method of claim 36, wherein the package does not comprise a microwave energy interactive material.

40. The method of claim 36, wherein the multi-ply structure of the microwaved package has a surface roughness from about 0 μm to about 25 μm.

41. The method of claim 36, wherein the multi-ply structure of the microwaved package has a surface roughness that is about 10% to about 99% lower than a comparative surface roughness of a conventional multi-ply structure of a conventional microwaved package.

42. The method of claim 36, wherein the microwaved package is in the form of a pouch that is formed from the multi-ply structure.

43. The method of claim 36, wherein the multi-ply structure further comprises an ink layer located between the barrier film and the first adhesive layer.

44. The method of claim 36, wherein the multi-ply structure further comprises a second adhesive and a first nylon layer, wherein the second adhesive layer is located between the barrier film and the first nylon layer, and the first nylon layer is located between the first and the second adhesive layers.

45. The method of claim 44, wherein the multi-ply structure further comprises a third adhesive layer and a second polyester layer, wherein the third adhesive layer is located between the first nylon layer and the second polyester layer, and the second polyester layer is located between the second and the third adhesive layers.

46. The method of claim 44, wherein the multi-ply structure further comprises a third adhesive layer and a second nylon layer, wherein the third adhesive layer is located between the barrier film and the second nylon layer, and the second nylon layer is located between the second and the third adhesive layers.

47. The method of claim 36, wherein the multi-ply structure further comprises a second polyester layer and a second adhesive layer, wherein the second adhesive layer is located between the second polyester layer and the barrier film, and the barrier film is located between the first and the second adhesive layers.

48. The method of claim 47, wherein the multi-ply structure further comprises an ink layer that is located between the second polyester layer and the second adhesive layer.

49. The method of claim 47, wherein the multi-ply structure further comprises a third adhesive layer and a nylon layer, wherein the nylon layer is located between the first and the third adhesive layers, and the third adhesive layer is located between the barrier film and the nylon layer.

50. A multi-ply structure comprising:
- a barrier film comprising a first polyester layer and a barrier coating layer;
- a multi-layered sealant film comprising a first nylon layer and a sealing layer, and a second nylon layer, a third nylon layer, three tie layers, a first polyolefin layer, and a second polyolefin layer that are each located between the first nylon layer and the sealing layer; and
- a first adhesive layer that is located between the barrier film and the multi-layered sealant film,
- wherein the first and the second polyolefin layers are located between the first and the second nylon layers,
- wherein the second and the third nylon layers are located between the second polyolefin layer and the sealing layer, and
- wherein a first of the three tie layers is located between the first nylon layer and the first polyolefin layer, a second of the three tie layers is located between the second polyolefin layer and the second nylon layer, and a third of the three tie layers is located between the third nylon layer and the sealing layer.

\* \* \* \* \*